(12) United States Patent
Tolentino et al.

(10) Patent No.: US 10,464,533 B2
(45) Date of Patent: *Nov. 5, 2019

(54) WIPER BLADE WITH COVER

(71) Applicant: Pylon Manufacturing Corp., Deerfield Beach, FL (US)

(72) Inventors: Vambi Raymundo Tolentino, Coconut Creek, FL (US); Robert Peter Peers, Boca Raton, FL (US)

(73) Assignee: Pylon Manufacturing Corp., Deerfield Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/928,467

(22) Filed: Oct. 30, 2015

(65) Prior Publication Data

US 2016/0059828 A1 Mar. 3, 2016

Related U.S. Application Data

(63) Continuation of application No. 13/587,389, filed on Aug. 16, 2012, now Pat. No. 9,174,609, which is a
(Continued)

(51) Int. Cl.
*B60S 1/40* (2006.01)
*B60S 1/04* (2006.01)
*B60S 1/38* (2006.01)

(52) U.S. Cl.
CPC ............... *B60S 1/40* (2013.01); *B60S 1/0491* (2013.01); *B60S 1/38* (2013.01); *B60S 1/3806* (2013.01);
(Continued)

(58) Field of Classification Search
CPC ...... B60S 1/0491; B60S 1/3863; B60S 1/381; B60S 2001/3843
See application file for complete search history.

(56) References Cited

U.S. PATENT DOCUMENTS

D56,762 S 12/1920 Minier
2,310,751 A 2/1943 Scinta
(Continued)

FOREIGN PATENT DOCUMENTS

AR 206463 7/1976
AU 409933 2/1971
(Continued)

OTHER PUBLICATIONS

FR2902394A1 (machine translation), 2007.*
(Continued)

*Primary Examiner* — Andrew A Horton
(74) *Attorney, Agent, or Firm* — Cozen O'Connor

(57) ABSTRACT

A cover for windshield wiper blades having an elongate body with a central collar and first and second elongate portions extending from the central collar. The first and second elongate portions having outer ends, and the central collar defining an interior passageway having a snap-fit tongue. A channel is disposed along each of the first and second elongate portions extending from the central collar towards the outer ends; and an end retainer or other securing mechanism is located at the outer ends. Also, windshield wiper blades incorporating such covers.

22 Claims, 24 Drawing Sheets

Related U.S. Application Data continuation-in-part of application No. 13/572,100, filed on Aug. 10, 2012, now abandoned, and a continuation-in-part of application No. 13/453,601, filed on Apr. 23, 2012, now Pat. No. 9,457,768.

(60) Provisional application No. 61/560,977, filed on Nov. 17, 2011, provisional application No. 61/561,098, filed on Nov. 17, 2011, provisional application No. 61/524,145, filed on Aug. 16, 2011, provisional application No. 61/522,091, filed on Aug. 10, 2011, provisional application No. 61/477,908, filed on Apr. 21, 2011.

(52) U.S. Cl.
CPC ........... *B60S 1/3849* (2013.01); *B60S 1/3863* (2013.01); *B60S 1/381* (2013.01); *B60S 1/3851* (2013.01); *B60S 1/3858* (2013.01); *B60S 1/3867* (2013.01); *B60S 2001/3843* (2013.01)

(56) References Cited

U.S. PATENT DOCUMENTS

| | | |
|---|---|---|
| 2,550,094 A | 4/1951 | Smulski |
| 2,589,339 A | 3/1952 | Carson |
| 2,616,112 A | 11/1952 | Smulski |
| 2,643,411 A | 6/1953 | Nesson |
| 2,658,223 A | 11/1953 | Enochian |
| 2,799,887 A | 7/1957 | Nemic |
| 2,801,436 A | 8/1957 | Scinta |
| 2,814,820 A | 12/1957 | Elliot et al. |
| 2,890,472 A | 6/1959 | Olson |
| 2,932,843 A | 4/1960 | Zaiger et al. |
| 2,937,393 A | 5/1960 | Brueder |
| 2,946,078 A | 7/1960 | Deibel et al. |
| 3,116,510 A | 1/1961 | Oishei et al. |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,132,367 A | 5/1964 | Wise |
| 3,139,644 A | 7/1964 | Smith |
| 3,147,506 A | 9/1964 | Williams |
| 3,147,507 A | 9/1964 | Glynm |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,405,421 A | 10/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,631 A | 7/1972 | Yamadai et al. |
| 3,685,086 A | 8/1972 | Frohlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,535 A | 3/1975 | Arman |
| 3,872,537 A | 3/1975 | Bianchi |
| 3,879,793 A | 4/1975 | Schlegel |
| 3,879,794 A | 4/1975 | Roberts, Jr. |
| 3,881,213 A | 5/1975 | Tilli |
| 3,881,214 A | 5/1975 | Palu |
| D236,337 S | 8/1975 | Deibel |
| 3,929,222 A | 12/1975 | Smith et al. |
| 3,942,212 A | 3/1976 | Steger et al. |
| 3,969,784 A | 7/1976 | Journee |
| D240,809 S | 8/1976 | Deibel |
| 3,995,347 A | 12/1976 | Kohler |
| 4,007,511 A | 2/1977 | Deibel |
| 4,009,504 A | 3/1977 | Arman |
| 4,028,770 A | 6/1977 | Appel |
| 4,047,480 A | 9/1977 | Vassiliou |
| 4,063,328 A | 12/1977 | Arman |
| D248,375 S | 7/1978 | Bergstein |
| D248,388 S | 7/1978 | Hughes |
| 4,102,003 A | 7/1978 | Hancu |
| 4,127,912 A | 12/1978 | Deibel et al. |
| 4,127,916 A | 12/1978 | Van den Berg et al. |
| D253,040 S | 10/1979 | Fournier et al. |
| D253,167 S | 10/1979 | Fournier et al. |
| D257,339 S | 10/1980 | Ellinwood |
| 4,239,104 A | 12/1980 | Roccaforte et al. |
| 4,308,635 A | 1/1982 | Maiocco |
| 4,309,790 A | 1/1982 | Bauer et al. |
| 4,324,019 A | 4/1982 | Mohnach et al. |
| 4,327,458 A | 5/1982 | Maiocco |
| 4,339,839 A | 7/1982 | Knights |
| 4,342,126 A | 8/1982 | Neefeldt |
| 4,343,063 A | 8/1982 | Batt |
| 4,354,293 A | 10/1982 | Le Sausse et al. |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| D282,243 S | 1/1986 | Mason |
| D282,718 S | 2/1986 | Fireman |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| 4,649,591 A | 3/1987 | Guerard |
| 4,670,284 A | 6/1987 | Berkoff |
| 4,670,934 A | 6/1987 | Epple et al. |
| D295,020 S | 4/1988 | Franchi |
| 4,741,071 A | 5/1988 | Bauer et al. |
| D296,317 S | 6/1988 | Mower et al. |
| 4,760,934 A | 8/1988 | Epple et al. |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,795,288 A | 1/1989 | Sakai |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| 4,930,180 A | 6/1990 | Longman |
| D310,193 S | 8/1990 | Charet |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,027,947 A | 7/1991 | Reighart |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| 5,082,078 A | 1/1992 | Umeda et al. |

(56) References Cited

U.S. PATENT DOCUMENTS

| | | |
|---|---|---|
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |
| D324,667 S | 3/1992 | Williams |
| 5,093,954 A | 3/1992 | Kuzuno |
| D327,013 S | 6/1992 | Reighart |
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |
| D336,739 S | 6/1993 | Wu et al. |
| 5,218,735 A | 6/1993 | Maubray |
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,289,608 A | 3/1994 | Kim |
| 5,307,536 A | 5/1994 | Lescher |
| 5,311,636 A | 5/1994 | Lee |
| 5,312,177 A | 5/1994 | Coulter |
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |
| D350,723 S | 9/1994 | Longazel |
| 5,349,716 A | 9/1994 | Millar |
| D353,354 S | 12/1994 | Oyama |
| 5,372,449 A | 12/1994 | Bauer et al. |
| 5,383,248 A | 1/1995 | Hi |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |
| 5,412,177 A | 5/1995 | Clark |
| 5,435,041 A | 7/1995 | Ho |
| 5,454,135 A | 10/1995 | Okuya et al. |
| 5,459,900 A | 10/1995 | Mege et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| 5,497,528 A | 3/1996 | Wu |
| 5,509,166 A | 4/1996 | Wagner et al. |
| D370,199 S | 5/1996 | Kim |
| 5,519,913 A | 5/1996 | Schedule |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| 5,568,670 A | 10/1996 | Samples et al. |
| D375,289 S | 11/1996 | Waselewski et al. |
| 5,577,292 A | 11/1996 | Blachetta et al. |
| D376,792 S | 12/1996 | Chodkiewicz |
| 5,593,125 A | 1/1997 | Storz et al. |
| D377,754 S | 2/1997 | Abbott et al. |
| 5,606,766 A | 3/1997 | Lee |
| 5,628,085 A | 5/1997 | Edele et al. |
| D379,613 S | 6/1997 | Chen |
| 5,647,088 A | 7/1997 | Bommer et al. |
| D382,848 S | 8/1997 | Chen |
| 5,661,870 A | 9/1997 | Eustache et al. |
| 5,661,871 A | 9/1997 | Scorsiroli |
| 5,701,010 A | 12/1997 | Martin |
| D389,449 S | 1/1998 | Hussaini |
| D390,823 S | 2/1998 | Baranowski et al. |
| D392,612 S | 3/1998 | Jonasson et al. |
| 5,732,437 A | 3/1998 | Jonasson et al. |
| D393,619 S | 4/1998 | Jeffer et al. |
| 5,742,973 A | 4/1998 | Kessler |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| 5,819,361 A | 10/1998 | Merkel et al. |
| 5,836,110 A | 11/1998 | Buening |
| D402,953 S | 12/1998 | Kim |
| D404,354 S | 1/1999 | Witek et al. |
| D406,094 S | 2/1999 | Lai |
| D406,257 S | 3/1999 | Lee |
| D406,755 S | 3/1999 | Garganese |
| D406,756 S | 3/1999 | Garganese |
| 5,875,672 A | 3/1999 | Fourie et al. |
| 5,885,023 A | 3/1999 | Witek et al. |
| 5,889,334 A | 3/1999 | Hongo |
| 5,899,334 A | 5/1999 | Domerchie et al. |
| D411,161 S | 6/1999 | Wooten |
| D411,504 S | 6/1999 | Hsu |
| 5,907,885 A | 6/1999 | Tilli et al. |
| 5,911,358 A | 6/1999 | Kenner et al. |
| 5,920,947 A | 7/1999 | Varner |
| D413,261 S | 8/1999 | Yerich |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,026,537 A | 2/2000 | Hojnacki |
| 6,055,697 A | 5/2000 | Wollenschlaeger |
| 6,063,216 A | 5/2000 | Damm et al. |
| D427,134 S | 6/2000 | Lee |
| 6,070,723 A | 6/2000 | Lewis |
| 6,088,872 A | 7/2000 | Schmid et al. |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| 6,216,311 B1 | 4/2001 | Van Damme et al. |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| 6,247,590 B1 | 6/2001 | Baker |
| D444,760 S | 7/2001 | Houssat et al. |
| D445,754 S | 7/2001 | Benoit |
| 6,266,843 B1 | 7/2001 | Doman et al. |

(56) References Cited

U.S. PATENT DOCUMENTS

| | | |
|---|---|---|
| 6,279,191 B1 | 8/2001 | Kotlarski et al. |
| 6,279,746 B1 | 8/2001 | Hussaini et al. |
| D448,295 S | 9/2001 | Mozes |
| 6,286,176 B1 | 9/2001 | Westermann et al. |
| 6,292,974 B1 | 9/2001 | Merket et al. |
| 6,295,690 B1 | 10/2001 | Merkel et al. |
| 6,301,742 B1 | 10/2001 | Kota |
| 6,305,066 B1 | 10/2001 | De Paolo et al. |
| 6,308,373 B1 | 10/2001 | Merkel et al. |
| 6,327,738 B1 | 12/2001 | Lewis |
| 6,332,236 B1 | 12/2001 | Ku |
| 6,336,243 B1 | 1/2002 | Charng |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| D462,044 S | 8/2002 | Gfatter et al. |
| 6,427,282 B1 | 8/2002 | Kotlarski |
| 6,434,780 B1 | 8/2002 | Kotlarski |
| D462,262 S | 9/2002 | Leja |
| 6,449,797 B1 | 9/2002 | De Block |
| 6,453,505 B1 | 9/2002 | Terai |
| D464,012 S | 10/2002 | Hussaini et al. |
| D464,600 S | 10/2002 | Chen |
| 6,499,181 B1 | 12/2002 | Kotlarski |
| D469,731 S | 2/2003 | Geer |
| 6,516,491 B2 | 2/2003 | Merkel et al. |
| 6,523,218 B1 | 2/2003 | Kotlarski |
| D471,505 S | 3/2003 | Wang |
| 6,530,111 B1 | 3/2003 | Kotlarski |
| D472,510 S | 4/2003 | Lin |
| D473,180 S | 4/2003 | Sun |
| D473,507 S | 4/2003 | Huang |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| 6,766,906 B2 | 6/2004 | Charng |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B2 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,902 S | 12/2004 | Lee et al. |
| D499,962 S | 12/2004 | Lee et al. |
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B2 | 3/2005 | Siklosi |
| 6,874,195 B2 | 4/2005 | Kotlarski |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,512 B2 | 12/2005 | Dietrich et al. |
| 7,007,339 B2 | 3/2006 | Weilet et al. |
| 7,024,722 B2 | 4/2006 | Neubauer et al. |
| 7,036,181 B2 | 5/2006 | Zimmer |
| D522,380 S | 6/2006 | Dibnah et al. |
| 7,055,207 B2 | 6/2006 | Coughlin |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 * | 12/2006 | Huang .................. B60S 1/381 15/250.201 |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,228,588 B2 | 6/2007 | Kraemer et al. |
| D546,669 S | 7/2007 | Sheppard et al. |
| D547,713 S | 7/2007 | Goeller |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,337,900 B2 | 3/2008 | Reiber et al. |
| 7,341,396 B2 | 3/2008 | Huang |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D575,146 S | 8/2008 | Lee |
| D577,324 S | 9/2008 | McCray |
| D579,849 S | 11/2008 | Garrastacho et al. |
| 7,451,520 B2 | 11/2008 | Weiler et al. |
| D582,765 S | 12/2008 | Gustafson et al. |
| 7,461,429 B2 | 12/2008 | Huang |
| 7,464,433 B2 | 12/2008 | Thomar et al. |
| D584,160 S | 1/2009 | Zimmermann |

(56) References Cited

U.S. PATENT DOCUMENTS

| | | |
|---|---|---|
| 7,472,451 B2 | 1/2009 | Hara et al. |
| D586,663 S | 2/2009 | Tidqvist |
| D586,716 S | 2/2009 | Radfar |
| D586,717 S | 2/2009 | Depondt |
| D587,186 S | 2/2009 | Herinckx et al. |
| 7,484,264 B2 | 2/2009 | Kraemer et al. |
| 7,493,672 B2 | 2/2009 | Op't Roodt |
| D588,933 S | 3/2009 | Bonzagni et al. |
| 7,506,401 B2 | 3/2009 | Park |
| 7,509,704 B2 | 3/2009 | Bauer et al. |
| 7,523,519 B2 | 4/2009 | Egner-Walter et al. |
| 7,523,520 B2 | 4/2009 | Breesch |
| 7,523,522 B2 | 4/2009 | Herring et al. |
| 7,526,832 B2 | 5/2009 | Matsumoto et al. |
| 7,527,151 B2 | 5/2009 | Park |
| D593,480 S | 6/2009 | Kim |
| 7,543,353 B2 | 6/2009 | Ko |
| 7,552,502 B2 | 6/2009 | Kagawa et al. |
| D596,102 S | 7/2009 | Kim |
| 7,559,110 B1 | 7/2009 | Kotlarski et al. |
| D601,077 S | 9/2009 | Kim |
| 7,581,280 B2 | 9/2009 | Op't Roodt et al. |
| 7,581,887 B2 | 9/2009 | Zimmer |
| 7,584,520 B2 | 9/2009 | Hussaini et al. |
| 7,596,479 B2 | 9/2009 | Weiler et al. |
| 7,603,741 B2 | 10/2009 | Verelst et al. |
| 7,603,742 B2 | 10/2009 | Nakano et al. |
| 7,607,194 B2 | 10/2009 | Weber et al. |
| 7,614,499 B2 | 11/2009 | Mueller |
| 7,621,016 B2 | 11/2009 | Verelst et al. |
| 7,628,560 B2 | 12/2009 | Westermann et al. |
| 7,636,980 B2 | 12/2009 | Nakano |
| D608,717 S | 1/2010 | Aglassinger |
| D610,518 S | 2/2010 | Aglassinger |
| D610,519 S | 2/2010 | Aglassinger |
| D610,520 S | 2/2010 | Aglassinger |
| D611,809 S | 3/2010 | Borgerson et al. |
| 7,669,276 B2 | 3/2010 | Verelst et al. |
| 7,687,565 B2 | 3/2010 | Geilenkirchen |
| 7,690,073 B2 | 4/2010 | Marmoy et al. |
| 7,699,169 B2 | 4/2010 | Lewis |
| D615,918 S | 5/2010 | Kim |
| 7,707,680 B2 | 5/2010 | Hawighorst et al. |
| 7,716,780 B2 | 5/2010 | Scholl et al. |
| 7,718,509 B2 | 5/2010 | Endo et al. |
| 7,743,457 B2 | 6/2010 | Metz |
| 7,748,076 B2 | 7/2010 | Weiler et al. |
| D621,322 S | 8/2010 | Lee et al. |
| 7,780,214 B2 | 8/2010 | Kraus et al. |
| 7,788,761 B2 | 9/2010 | Weiler et al. |
| 7,793,382 B2 | 9/2010 | Van De Rovaart |
| 7,797,787 B2 | 9/2010 | Wilms et al. |
| 7,805,800 B2 | 10/2010 | Wilms et al. |
| 7,810,206 B2 | 10/2010 | Weiler et al. |
| 7,814,611 B2 | 10/2010 | Heinrich et al. |
| 7,823,953 B2 | 11/2010 | Haas |
| 7,832,045 B2 | 11/2010 | Weiler et al. |
| 7,832,047 B2 | 11/2010 | Herinckx et al. |
| 7,836,542 B2 | 11/2010 | Dietrich et al. |
| 7,849,553 B2 | 12/2010 | Weiler et al. |
| D632,557 S | 2/2011 | Clamagirand et al. |
| 7,886,401 B2 | 2/2011 | Weber et al. |
| 7,891,043 B2 | 2/2011 | Kraus et al. |
| 7,891,044 B2 | 2/2011 | Fink et al. |
| 7,895,702 B2 | 3/2011 | Tisch et al. |
| 7,895,703 B2 | 3/2011 | Ina et al. |
| 7,898,141 B2 | 3/2011 | Hurst et al. |
| 7,899,596 B2 | 3/2011 | Zimmer |
| 7,908,703 B2 | 3/2011 | Van Bealen |
| 7,908,704 B2 | 3/2011 | Kraemer |
| 7,921,503 B1 | 4/2011 | Chiang |
| 7,921,504 B1 | 4/2011 | Chiang |
| 7,921,506 B2 | 4/2011 | Chiang |
| 7,926,659 B2 | 4/2011 | Kim |
| 7,930,796 B2 | 4/2011 | Weiler et al. |
| D637,132 S | 5/2011 | Kim |
| 7,937,798 B2 | 5/2011 | Fink et al. |
| 7,941,891 B2 | 5/2011 | Breesch |
| 7,941,892 B2 | 5/2011 | Kraus et al. |
| 7,945,985 B2 | 5/2011 | Stubner |
| 7,945,987 B2 | 5/2011 | Verelst et al. |
| 7,950,717 B2 | 5/2011 | Metz |
| 7,962,787 B2 | 6/2011 | Camilleri et al. |
| 7,966,689 B2 | 6/2011 | Rovaart et al. |
| 7,971,312 B2 | 7/2011 | Crabee et al. |
| 7,975,849 B2 | 7/2011 | Kim |
| 7,989,955 B2 | 8/2011 | Yagi |
| 7,996,953 B2 | 8/2011 | Braun et al. |
| D644,925 S | 9/2011 | Jaworski |
| 8,020,246 B2 | 9/2011 | Bauer et al. |
| 8,020,248 B2 | 9/2011 | Hasegawa |
| 8,020,249 B2 | 9/2011 | Masuda et al. |
| 8,026,645 B2 | 9/2011 | Stubner et al. |
| D647,451 S | 10/2011 | Lin |
| 8,042,690 B2 | 10/2011 | Lewis |
| D647,795 S | 11/2011 | Eaton et al. |
| 8,051,526 B2 | 11/2011 | Summerville et al. |
| 8,060,976 B2 | 11/2011 | Mayer et al. |
| 8,069,528 B2 | 12/2011 | Verelst et al. |
| 8,076,807 B2 | 12/2011 | Bohn et al. |
| D651,509 S | 1/2012 | Methe et al. |
| 8,096,013 B2 | 1/2012 | Eschenbrenner et al. |
| 8,099,823 B2 | 1/2012 | Kraemer et al. |
| 8,104,134 B2 | 1/2012 | Ritt |
| 8,104,136 B2 | 1/2012 | Carangelo |
| 8,117,710 B2 | 2/2012 | Kraus et al. |
| 8,125,111 B2 | 2/2012 | Bohn et al. |
| 8,141,198 B2 | 3/2012 | Wilms et al. |
| 8,148,467 B2 | 4/2012 | Pieters et al. |
| 8,151,656 B2 | 4/2012 | Nicgorski, II |
| D658,494 S | 5/2012 | Raimer et al. |
| 8,181,308 B2 | 5/2012 | Kwon et al. |
| 8,186,002 B2 | 5/2012 | Kinnaert et al. |
| 8,191,200 B2 | 6/2012 | Kim |
| 8,261,403 B2 | 9/2012 | Ehde |
| 8,261,405 B2 | 9/2012 | Kim et al. |
| 8,272,096 B2 | 9/2012 | Wilms et al. |
| D671,827 S | 12/2012 | Raimer et al. |
| 8,328,011 B2 | 12/2012 | Skurdalsvold et al. |
| 8,341,799 B2 | 1/2013 | Koppen et al. |
| 8,381,348 B2 | 2/2013 | Egner-Walter et al. |
| D680,051 S | 4/2013 | Tolentino et al. |
| 8,413,291 B2 | 4/2013 | Wu |
| 8,434,621 B2 | 5/2013 | Hun et al. |
| D684,862 S | 6/2013 | DiFranza |
| D685,260 S | 7/2013 | Thielemier |
| D686,912 S | 7/2013 | Ehde et al. |
| 8,474,088 B2 | 7/2013 | Wu |
| 8,490,239 B2 | 7/2013 | Ehde |
| 8,505,724 B2 | 8/2013 | Bult et al. |
| 8,510,897 B2 | 8/2013 | Ku |
| 8,510,898 B2 | 8/2013 | Ku |
| 8,544,137 B2 | 10/2013 | Thienard |
| 8,555,456 B2 | 10/2013 | Ehde |
| D692,750 S | 11/2013 | Ehde et al. |
| D692,818 S | 11/2013 | Tolentino et al. |
| D692,819 S | 11/2013 | Tolentino et al. |
| D693,213 S | 11/2013 | Lee et al. |
| D695,632 S | 12/2013 | Akana et al. |
| 8,613,357 B2 | 12/2013 | Putnam |
| D697,790 S | 1/2014 | Iwegbu |
| D700,524 S | 3/2014 | Ferriter |
| D702,619 S | 4/2014 | Kim |
| D704,620 S | 5/2014 | Kim |
| D706,200 S | 6/2014 | Tolentino et al. |
| D708,890 S | 7/2014 | Kim et al. |
| D709,362 S | 7/2014 | Kim |
| D711,217 S | 8/2014 | Jacobs et al. |
| D714,635 S | 10/2014 | Demar et al. |
| D715,142 S | 10/2014 | Allen et al. |
| D717,225 S | 11/2014 | Kuo |
| D725,025 S | 3/2015 | Poton |
| 9,174,609 B2 * | 11/2015 | Tolentino .............. B60S 1/0491 |
| D744,331 S | 12/2015 | Vos et al. |

(56) References Cited

U.S. PATENT DOCUMENTS

| | | |
|---|---|---|
| D746,700 S | 1/2016 | Boehnen et al. |
| 9,505,380 B2 | 11/2016 | Tolentino et al. |
| D777,079 S | 1/2017 | Tolentino et al. |
| D784,804 S | 4/2017 | Peers et al. |
| D787,308 S | 5/2017 | Kawashima et al. |
| D787,312 S | 5/2017 | Peers et al. |
| 2001/0013236 A1 | 8/2001 | Weyerstall et al. |
| 2002/0043092 A1 | 4/2002 | Jones et al. |
| 2002/0112306 A1 | 8/2002 | Komerska |
| 2002/0174505 A1 | 11/2002 | Kim |
| 2002/0192017 A1 | 12/2002 | Rosenstein et al. |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0074763 A1 | 4/2003 | Egner-Walter et al. |
| 2003/0159229 A1 | 8/2003 | Weiler et al. |
| 2003/0209049 A1 | 11/2003 | Jones et al. |
| 2003/0221276 A1 | 12/2003 | Siklosi |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0052577 A1 | 3/2004 | Lee et al. |
| 2004/0098821 A1* | 5/2004 | Kraemer ............... B60S 1/381 15/250.201 |
| 2004/0159994 A1 | 8/2004 | Lenzen et al. |
| 2004/0211021 A1 | 10/2004 | Weber et al. |
| 2004/0244137 A1 | 12/2004 | Poton |
| 2004/0250369 A1 | 12/2004 | Matsumoto et al. |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0166349 A1 | 8/2005 | Nakano et al. |
| 2005/0177970 A1 | 8/2005 | Scholl et al. |
| 2005/0252812 A1 | 11/2005 | Lewis |
| 2006/0010636 A1 | 1/2006 | Vacher |
| 2006/0112511 A1 | 6/2006 | Op't Roodt et al. |
| 2006/0117515 A1 | 6/2006 | Fink et al. |
| 2006/0130263 A1 | 6/2006 | Coughlin |
| 2006/0156529 A1 | 7/2006 | Thomar et al. |
| 2006/0179597 A1 | 8/2006 | Hoshino et al. |
| 2006/0218740 A1 | 10/2006 | Coughlin |
| 2006/0230571 A1 | 10/2006 | Son |
| 2006/0248675 A1 | 11/2006 | Vacher et al. |
| 2006/0282972 A1 | 12/2006 | Huang |
| 2007/0017056 A1 | 1/2007 | Cooke et al. |
| 2007/0067939 A1 | 3/2007 | Huang |
| 2007/0067941 A1 | 3/2007 | Huang |
| 2007/0089257 A1 | 4/2007 | Harita et al. |
| 2007/0089527 A1 | 4/2007 | Shank et al. |
| 2007/0186366 A1 | 8/2007 | Alley |
| 2007/0220698 A1 | 9/2007 | Huang |
| 2007/0226940 A1 | 10/2007 | Thienard |
| 2007/0226941 A1 | 10/2007 | Kraemer et al. |
| 2007/0234501 A1 | 10/2007 | Ho et al. |
| 2007/0268517 A1 | 11/2007 | Kim et al. |
| 2008/0083082 A1 | 4/2008 | Rovaart et al. |
| 2008/0086830 A1 | 4/2008 | Kim |
| 2008/0092320 A1 | 4/2008 | Cempura et al. |
| 2008/0098554 A1 | 5/2008 | Cho |
| 2008/0098559 A1* | 5/2008 | Machida ............... B60S 1/3801 15/250.201 |
| 2008/0115308 A1 | 5/2008 | Lee |
| 2008/0196192 A1 | 8/2008 | Yao |
| 2008/0222830 A1 | 9/2008 | Chiang |
| 2008/0222831 A1 | 9/2008 | Thienard |
| 2008/0222832 A1 | 9/2008 | Huang |
| 2008/0263805 A1 | 10/2008 | Sebring |
| 2008/0289133 A1 | 11/2008 | Kim |
| 2009/0007364 A1 | 1/2009 | Jarasson et al. |
| 2009/0013492 A1 | 1/2009 | Henin |
| 2009/0056049 A1 | 3/2009 | Jarasson et al. |
| 2009/0064440 A1 | 3/2009 | Boland |
| 2009/0126140 A1 | 5/2009 | Heinrich et al. |
| 2009/0151110 A1 | 6/2009 | Ku |
| 2009/0158545 A1 | 6/2009 | Grasso et al. |
| 2009/0172910 A1 | 7/2009 | De Block et al. |
| 2009/0178226 A1 | 7/2009 | Lee et al. |
| 2009/0199357 A1 | 8/2009 | Thienard |
| 2010/0005608 A1 | 1/2010 | Chien |
| 2010/0005609 A1 | 1/2010 | Kim |
| 2010/0024149 A1 | 2/2010 | Erdal |
| 2010/0024151 A1 | 2/2010 | Ku |
| 2010/0050360 A1 | 3/2010 | Chiang |
| 2010/0050361 A1 | 3/2010 | Chang et al. |
| 2010/0064468 A1 | 3/2010 | Kang |
| 2010/0083454 A1 | 4/2010 | Op't Roodt et al. |
| 2010/0186185 A1 | 7/2010 | Grasso et al. |
| 2010/0205763 A1 | 8/2010 | Ku |
| 2010/0212101 A1 | 8/2010 | Thienard et al. |
| 2010/0236008 A1 | 9/2010 | Yang et al. |
| 2010/0236675 A1 | 9/2010 | Schneider |
| 2010/0242204 A1 | 9/2010 | Chien |
| 2010/0281645 A1 | 11/2010 | Kim et al. |
| 2011/0005020 A1 | 1/2011 | Koppen et al. |
| 2011/0041280 A1 | 2/2011 | Choi et al. |
| 2011/0047742 A1 | 3/2011 | Kim et al. |
| 2011/0072607 A1 | 3/2011 | Van Baelen et al. |
| 2011/0107542 A1 | 5/2011 | Op't Roodt |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277264 A1 | 11/2011 | Ehde |
| 2011/0277266 A1 | 11/2011 | Umeno |
| 2012/0027206 A1 | 2/2012 | Suzuki et al. |
| 2012/0047673 A1 | 3/2012 | Depondt |
| 2012/0054976 A1 | 3/2012 | Yang et al. |
| 2012/0060316 A1 | 3/2012 | Avasiloaie et al. |
| 2012/0090123 A1 | 4/2012 | Caillot et al. |
| 2012/0102669 A1 | 5/2012 | Lee et al. |
| 2012/0144615 A1 | 6/2012 | Song et al. |
| 2012/0159733 A1 | 6/2012 | Kwon |
| 2012/0180245 A1 | 7/2012 | Ku |
| 2012/0180246 A1 | 7/2012 | Ku |
| 2012/0266405 A1 | 10/2012 | Tolentinto et al. |
| 2012/0279008 A1 | 11/2012 | Depondt |
| 2012/0311808 A1 | 12/2012 | Yang et al. |
| 2012/0317740 A1 | 12/2012 | Yang et al. |
| 2013/0025084 A1 | 1/2013 | Tolentino et al. |
| 2013/0067674 A1 | 3/2013 | Chiang |
| 2013/0067675 A1 | 3/2013 | Chien |
| 2013/0104334 A1 | 5/2013 | Depondt |
| 2013/0125333 A1 | 5/2013 | Tolentino et al. |
| 2013/0152323 A1 | 6/2013 | Chien |
| 2013/0152326 A1 | 6/2013 | Oslizlo et al. |
| 2013/0152330 A1 | 6/2013 | Kim et al. |
| 2013/0167316 A1 | 7/2013 | Egner-Walter et al. |
| 2013/0192015 A1 | 8/2013 | Tolentino et al. |
| 2013/0192016 A1 | 8/2013 | Kim et al. |
| 2013/0198992 A1 | 8/2013 | Tolentino et al. |
| 2013/0205532 A1 | 8/2013 | Tolentino et al. |
| 2013/0219649 A1 | 8/2013 | Tolentinto et al. |
| 2013/0227809 A1 | 9/2013 | Tolentinto et al. |
| 2013/0227810 A1 | 9/2013 | Tolentinto et al. |
| 2013/0247323 A1 | 9/2013 | Geubel et al. |
| 2013/0255026 A1 | 10/2013 | Depondt |
| 2013/0263400 A1 | 10/2013 | Duesterhoeft et al. |
| 2013/0333145 A1 | 12/2013 | Depondt |
| 2013/0333146 A1 | 12/2013 | Depondt |
| 2014/0026348 A1 | 1/2014 | Schaeuble |
| 2014/0026349 A1 | 1/2014 | Schaeuble |
| 2014/0082875 A1 | 3/2014 | Peers et al. |
| 2014/0130287 A1 | 5/2014 | Bex et al. |
| 2014/0182075 A1 | 7/2014 | Polocoser et al. |
| 2014/0317875 A1 | 10/2014 | Tolentino et al. |
| 2015/0135468 A1 | 5/2015 | Kim |
| 2015/0251636 A1 | 9/2015 | Kim et al. |
| 2015/0274130 A1 | 10/2015 | Tolentinto et al. |
| 2015/0274131 A1 | 10/2015 | Tolentinto et al. |
| 2015/0353054 A1 | 12/2015 | Tolentino et al. |
| 2016/0046263 A1 | 2/2016 | Tolentino et al. |
| 2016/0159323 A1 | 6/2016 | Tolentinto et al. |

(56) References Cited

U.S. PATENT DOCUMENTS

| | | |
|---|---|---|
| 2016/0280186 A1 | 9/2016 | Peers et al. |
| 2016/0375807 A1 | 12/2016 | Tolentino et al. |
| 2017/0057464 A1 | 3/2017 | Tolentinto et al. |
| 2017/0072912 A1 | 3/2017 | Tolentino et al. |
| 2017/0113656 A1 | 4/2017 | Tolentino |

FOREIGN PATENT DOCUMENTS

| | | |
|---|---|---|
| AU | 410701 | 2/1971 |
| AU | 649730 | 6/1994 |
| AU | 729371 | 7/2001 |
| AU | 741730 | 12/2001 |
| AU | 762557 | 6/2003 |
| AU | 770944 | 3/2004 |
| AU | 2003257828 | 3/2004 |
| AU | 780818 | 4/2005 |
| AU | 2006100618 | 8/2006 |
| AU | 2006241297 | 6/2007 |
| AU | 2006203445 | 10/2007 |
| AU | 2008100641 | 8/2008 |
| AU | 2009238193 | 10/2009 |
| AU | 2009324257 | 8/2010 |
| AU | 2010294766 A1 | 2/2012 |
| BR | 8304484 | 4/1984 |
| BR | 8604381 | 5/1987 |
| BR | 8707390 | 11/1988 |
| BR | 8903473 | 3/1990 |
| BR | 8907154 | 2/1991 |
| BR | 9005080 | 8/1991 |
| BR | 9105809 | 8/1992 |
| BR | 9200129 | 10/1992 |
| BR | 0006164 | 4/2001 |
| BR | 0007263 | 10/2001 |
| BR | 0106665 | 4/2002 |
| BR | 0106667 | 4/2002 |
| BR | 0306135 | 10/2004 |
| BR | PI0411532 | 8/2006 |
| BR | PI0506158 | 10/2006 |
| BR | PI0007263 | 1/2009 |
| BR | PI0519259 | 1/2009 |
| BR | 0006917 | 8/2009 |
| BR | PI0606903 | 8/2009 |
| BR | PI0901324 | 4/2010 |
| BR | PI0006963 | 9/2010 |
| BR | PI0706762 | 4/2011 |
| BR | PI1000961 | 6/2011 |
| BR | PI0621265 | 12/2011 |
| CA | 954258 | 9/1974 |
| CA | 966609 | 4/1975 |
| CA | 1038117 | 9/1978 |
| CA | 1075414 | 4/1980 |
| CA | 1124462 | 6/1982 |
| CA | 1184712 | 4/1985 |
| CA | 1257059 | 7/1989 |
| CA | 1263803 | 12/1989 |
| CA | 2027227 | 4/1991 |
| CA | 1289308 | 9/1991 |
| CA | 2037400 | 2/1992 |
| CA | 2093956 | 4/1992 |
| CA | 2079846 | 7/1993 |
| CA | 2118874 | 9/1994 |
| CA | 2156345 | 2/1996 |
| CA | 2174030 | 5/1997 |
| CA | 2260175 | 1/1998 |
| CA | 2220462 | 7/1998 |
| CA | 2243143 | 1/1999 |
| CA | 2344888 | 4/2000 |
| CA | 2414099 | 1/2002 |
| CA | 2472914 | 8/2003 |
| CA | 2487799 | 12/2003 |
| CA | 2515071 | 8/2004 |
| CA | 2242776 | 7/2005 |
| CA | 2553977 | 9/2005 |
| CA | 2554048 A1 | 9/2005 |
| CA | 2514372 | 1/2006 |
| CA | 2574330 | 2/2006 |
| CA | 2523315 | 4/2006 |
| CA | 2541641 | 4/2006 |
| CA | 2522729 | 6/2006 |
| CA | 2598104 | 9/2006 |
| CA | 2550409 | 11/2006 |
| CA | 2568561 | 5/2007 |
| CA | 2569175 | 5/2007 |
| CA | 2569176 | 5/2007 |
| CA | 2569977 | 6/2007 |
| CA | 2560155 | 9/2007 |
| CA | 2645821 | 10/2007 |
| CA | 2649474 | 11/2007 |
| CA | 2649760 | 11/2007 |
| CA | 2651069 | 11/2007 |
| CA | 2590443 | 4/2008 |
| CA | 2631513 | 5/2008 |
| CA | 2574242 | 7/2008 |
| CA | 2617013 | 11/2008 |
| CA | 2628517 | 4/2009 |
| CA | 2671767 | 1/2010 |
| CA | 2500891 | 5/2011 |
| CA | 2789431 | 8/2011 |
| CA | 2809243 | 3/2012 |
| CA | 2809292 | 3/2012 |
| CA | 2809947 | 3/2012 |
| CA | 2831801 A1 | 10/2012 |
| CA | 2835703 | 11/2012 |
| CA | 2843527 | 1/2013 |
| CA | 2843637 | 2/2013 |
| CA | 2843644 | 2/2013 |
| CA | 2797693 | 5/2013 |
| CA | 147027 S | 6/2013 |
| CA | 147028 S | 6/2013 |
| CA | 2799267 | 6/2013 |
| CA | 2740384 | 7/2013 |
| CA | 2865292 A1 | 8/2013 |
| CA | 2906883 A1 | 9/2014 |
| CA | 2898928 A1 | 1/2017 |
| CA | 2865295 C | 3/2017 |
| CL | 2014002239 A1 | 5/2015 |
| CL | 2014002241 A1 | 5/2015 |
| CL | 2015002093 A1 | 4/2016 |
| CN | 101983148 | 3/2011 |
| CN | 202593459 | 12/2012 |
| CN | 102963337 | 3/2013 |
| CN | 102991462 | 3/2013 |
| CN | 102991466 | 3/2013 |
| CN | 103101514 | 5/2013 |
| CN | 103101516 | 5/2013 |
| CN | 103108782 | 5/2013 |
| CN | 103183009 | 7/2013 |
| CN | 103223923 | 7/2013 |
| CN | 103228498 | 7/2013 |
| CO | 7141449 A2 | 12/2014 |
| CO | 7141460 A2 | 12/2014 |
| DE | 2309063 | 8/1974 |
| DE | 2311293 | 9/1974 |
| DE | 2353368 | 5/1975 |
| DE | 3222864 | 12/1983 |
| DE | 3919050 A1 | 12/1990 |
| DE | 4439275 A1 | 5/1995 |
| DE | 19650929 | 6/1998 |
| DE | 19734843 | 2/1999 |
| DE | 19745460 | 4/1999 |
| DE | 19814609 | 10/1999 |
| DE | 10228494 A1 | 1/2004 |
| DE | 10320930 | 11/2004 |
| DE | 10343571 A1 | 4/2005 |
| DE | 102004019157 | 11/2005 |
| DE | 102004061088 | 6/2006 |
| DE | 102005019389 | 11/2006 |
| DE | 102005062462 A1 | 6/2007 |
| DE | 102006057024 | 6/2008 |
| DE | 102007030169 | 1/2009 |
| DE | 102007051549 | 4/2009 |
| DE | 102008042516 | 5/2009 |
| DE | 102008001045 | 10/2009 |
| DE | 102008021457 | 11/2009 |

(56) References Cited

FOREIGN PATENT DOCUMENTS

| | | |
|---|---|---|
| DE | 102008002447 | 12/2009 |
| DE | 102008049269 | 4/2010 |
| DE | 102008049270 | 4/2010 |
| DE | 102009000483 | 4/2010 |
| DE | 102009001025 | 8/2010 |
| DE | 102010012983 | 2/2011 |
| DE | 102009029469 | 3/2011 |
| DE | 102009029470 | 3/2011 |
| DE | 102009048212 | 4/2011 |
| DE | 102010016348 | 4/2011 |
| DE | 102010041152 A1 | 5/2011 |
| DE | 102010003269 | 9/2011 |
| DE | 202011005213 | 9/2011 |
| DE | 202011100429 | 9/2011 |
| DE | 102010003645 | 10/2011 |
| DE | 102010028102 | 10/2011 |
| DE | 102010029107 | 11/2011 |
| DE | 102010030880 | 1/2012 |
| DE | 102010039526 | 2/2012 |
| EP | 0594451 | 4/1994 |
| EP | 0633170 | 1/1995 |
| EP | 0665143 A1 | 8/1995 |
| EP | 0683703 | 11/1995 |
| EP | 0695246 | 2/1996 |
| EP | 0749378 | 12/1996 |
| EP | 0757636 | 2/1997 |
| EP | 0760761 | 3/1997 |
| EP | 0777594 | 6/1997 |
| EP | 0792704 | 9/1997 |
| EP | 0810936 | 12/1997 |
| EP | 0828638 | 3/1998 |
| EP | 0841229 | 5/1998 |
| EP | 0847346 | 6/1998 |
| EP | 0847347 | 6/1998 |
| EP | 0853561 | 7/1998 |
| EP | 0853563 | 7/1998 |
| EP | 0853565 | 7/1998 |
| EP | 0885791 A1 | 12/1998 |
| EP | 0914269 | 5/1999 |
| EP | 0926028 | 6/1999 |
| EP | 0930991 | 7/1999 |
| EP | 0935546 | 8/1999 |
| EP | 0943511 | 9/1999 |
| EP | 1022202 | 7/2000 |
| EP | 1037778 | 9/2000 |
| EP | 0783998 | 10/2000 |
| EP | 1056628 | 12/2000 |
| EP | 1098795 | 5/2001 |
| EP | 1098796 | 5/2001 |
| EP | 1109706 | 6/2001 |
| EP | 1119475 | 8/2001 |
| EP | 1119476 | 8/2001 |
| EP | 1178907 | 2/2002 |
| EP | 1197406 | 4/2002 |
| EP | 10054287 | 5/2002 |
| EP | 1243489 | 9/2002 |
| EP | 1247707 | 10/2002 |
| EP | 1257445 | 11/2002 |
| EP | 1289804 | 3/2003 |
| EP | 1289806 | 3/2003 |
| EP | 1294596 | 3/2003 |
| EP | 1337420 | 8/2003 |
| EP | 1412235 | 4/2004 |
| EP | 1017514 | 6/2004 |
| EP | 1425204 | 6/2004 |
| EP | 1436179 A1 | 7/2004 |
| EP | 1448414 | 8/2004 |
| EP | 1462327 | 9/2004 |
| EP | 1485279 | 12/2004 |
| EP | 1494901 | 1/2005 |
| EP | 1494902 | 1/2005 |
| EP | 1501710 | 2/2005 |
| EP | 1519862 | 4/2005 |
| EP | 1547883 | 6/2005 |
| EP | 1612113 A2 | 1/2006 |
| EP | 1312522 | 4/2006 |
| EP | 1666319 | 6/2006 |
| EP | 1708911 A1 | 10/2006 |
| EP | 1719673 | 11/2006 |
| EP | 1733939 | 12/2006 |
| EP | 1740424 | 1/2007 |
| EP | 1744940 | 1/2007 |
| EP | 1753646 | 2/2007 |
| EP | 1758772 | 3/2007 |
| EP | 1769987 | 4/2007 |
| EP | 1792794 | 6/2007 |
| EP | 1799518 | 6/2007 |
| EP | 1800977 | 6/2007 |
| EP | 1800978 | 6/2007 |
| EP | 1833708 A1 | 9/2007 |
| EP | 1846274 | 10/2007 |
| EP | 1849666 A1 | 10/2007 |
| EP | 1937524 A1 | 7/2008 |
| EP | 2015971 | 1/2009 |
| EP | 2050638 | 4/2009 |
| EP | 2079617 | 7/2009 |
| EP | 2109557 | 10/2009 |
| EP | 2113432 | 11/2009 |
| EP | 2127969 | 12/2009 |
| EP | 2134576 | 12/2009 |
| EP | 2138363 A1 | 12/2009 |
| EP | 2143603 | 1/2010 |
| EP | 2146877 | 1/2010 |
| EP | 2177406 A2 | 4/2010 |
| EP | 2230140 | 9/2010 |
| EP | 2236364 A1 | 10/2010 |
| EP | 2236366 | 10/2010 |
| EP | 2253520 | 11/2010 |
| EP | 2258592 | 12/2010 |
| EP | 1559623 | 1/2011 |
| EP | 2300283 A1 | 3/2011 |
| EP | 2321160 | 5/2011 |
| EP | 2338747 | 6/2011 |
| EP | 2426017 | 3/2012 |
| EP | 002088146-0001 A1 | 8/2012 |
| EP | 002088146-0002 A1 | 8/2012 |
| EP | 2532558 A2 | 12/2012 |
| EP | 2551157 A1 | 1/2013 |
| EP | 2560847 A1 | 2/2013 |
| EP | 2571733 A1 | 3/2013 |
| EP | 2578458 A1 | 4/2013 |
| EP | 2421729 B1 | 3/2014 |
| EP | 2817183 A1 | 12/2014 |
| EP | 2817184 A1 | 12/2014 |
| EP | 002674887-0001 A1 | 2/2015 |
| EP | 2969671 A1 | 1/2016 |
| FR | 2437959 A1 | 4/1980 |
| FR | 2736025 A1 | 1/1997 |
| FR | 2738201 A1 | 3/1997 |
| FR | 2747976 A1 | 10/1997 |
| FR | 2804392 A1 | 8/2001 |
| FR | 2879987 | 6/2006 |
| FR | 2902394 A1 * | 12/2007 ............ B60S 1/3848 |
| FR | 2957877 | 9/2011 |
| GB | 1395918 | 5/1975 |
| GB | 1405579 | 9/1975 |
| GB | 2188672 | 10/1987 |
| GB | 2220844 A | 1/1990 |
| GB | 2324237 | 10/1998 |
| GB | 2348118 A | 9/2000 |
| HK | 1110560 | 5/2010 |
| HK | 1105928 | 8/2010 |
| HK | 1108573 | 10/2011 |
| HK | 1110561 | 7/2012 |
| JP | 60092136 A | 5/1985 |
| JP | 0374242 A | 3/1991 |
| JP | 3572527 B2 | 10/2004 |
| JP | 2008037388 A | 2/2008 |
| KR | 10-089115 | 2/2009 |
| KR | 10-0891195 B1 | 4/2009 |
| KR | 20120029616 A | 3/2012 |
| MX | 169141 | 6/1993 |
| MX | 9708272 | 8/1998 |
| MX | 9708273 | 8/1998 |

(56) References Cited

FOREIGN PATENT DOCUMENTS

| | | |
|---|---|---|
| MX | PA03010189 | 3/2004 |
| MX | PA03010190 | 3/2004 |
| MX | PA05002760 | 6/2005 |
| MX | PA05002988 | 6/2005 |
| MX | PA05008266 | 9/2005 |
| MX | PA05005581 | 11/2005 |
| MX | PA06008594 | 8/2006 |
| MX | 2007007828 | 7/2007 |
| MX | 2007007829 | 7/2007 |
| MX | 2008012325 | 10/2008 |
| MX | 2008013480 | 10/2008 |
| MX | 2008013814 | 12/2008 |
| MX | 2008014163 | 2/2009 |
| MX | 2009013050 | 1/2010 |
| MX | 2009013051 | 1/2010 |
| MX | 2010009333 | 10/2010 |
| MX | 2011000597 | 3/2011 |
| MX | 2011000598 | 3/2011 |
| MX | 2011003242 | 4/2011 |
| MX | 2011003243 | 4/2011 |
| MX | 2011003911 | 9/2011 |
| MX | 2012002314 | 6/2012 |
| MX | 2013002710 | 5/2013 |
| MX | 2013006881 | 7/2013 |
| MX | 2014001106 A | 3/2014 |
| MX | 2013011449 A | 6/2014 |
| MX | 2013006260 A | 7/2014 |
| MX | 2014001162 A | 7/2014 |
| MX | 2014001161 A | 11/2014 |
| MX | 2014010123 A | 11/2014 |
| MX | 2014010122 A | 5/2015 |
| MX | 2015013210 A | 12/2015 |
| MY | 122308 | 4/2006 |
| MY | 122563 | 4/2006 |
| MY | 128028 | 1/2007 |
| MY | 128970 | 3/2007 |
| PT | 1800978 | 5/2011 |
| PT | 1800977 | 1/2012 |
| RU | 2238198 | 10/2004 |
| RU | 2251500 | 5/2005 |
| RU | 2260527 | 9/2005 |
| RU | 2260528 | 9/2005 |
| RU | 2268176 | 1/2006 |
| RU | 2271287 | 3/2006 |
| RU | 2293034 | 2/2007 |
| RU | 2294291 | 2/2007 |
| RU | 2007127898 | 1/2009 |
| RU | 80415 | 2/2009 |
| RU | 2346834 | 2/2009 |
| RU | 2369500 | 10/2009 |
| RU | 2381120 | 2/2010 |
| RU | 2394706 | 7/2010 |
| RU | 2416536 C1 | 4/2011 |
| RU | 105237 | 6/2011 |
| RU | 108350 | 9/2011 |
| RU | 108741 | 9/2011 |
| RU | 2456180 C2 | 7/2012 |
| RU | 2493033 C2 | 9/2013 |
| RU | 2526773 C2 | 8/2014 |
| RU | 2543448 C2 | 2/2015 |
| RU | 2560217 C2 | 8/2015 |
| RU | 2560954 C2 | 8/2015 |
| RU | 2561173 C2 | 8/2015 |
| RU | 2577830 C1 | 3/2016 |
| RU | 2577981 C1 | 3/2016 |
| RU | 2578001 C2 | 3/2016 |
| RU | 2015144362 A | 4/2017 |
| TW | M404153 U1 | 5/2011 |
| TW | 103183008 | 7/2013 |
| TW | 201325952 | 7/2013 |
| TW | 201325953 | 7/2013 |
| WO | WO 81/03308 | 11/1981 |
| WO | WO 91/06451 | 5/1991 |
| WO | WO 92/06869 | 4/1992 |
| WO | WO 97/12787 | 4/1997 |
| WO | WO 98/01328 | 1/1998 |
| WO | WO 98/01329 | 1/1998 |
| WO | WO 98/50261 | 11/1998 |
| WO | WO 98/51203 | 11/1998 |
| WO | WO 98/51550 | 11/1998 |
| WO | WO 99/08818 | 2/1999 |
| WO | WO 99/15382 | 4/1999 |
| WO | WO 99/56992 | 11/1999 |
| WO | WO 00/05111 | 2/2000 |
| WO | WO 00/06431 | 2/2000 |
| WO | WO 00/21808 | 4/2000 |
| WO | WO 00/21809 | 4/2000 |
| WO | WO 00/21811 | 4/2000 |
| WO | WO 00/38963 | 7/2000 |
| WO | WO 00/38964 | 7/2000 |
| WO | WO 00/53470 | 9/2000 |
| WO | WO 0061409 | 10/2000 |
| WO | WO 01/26942 | 4/2001 |
| WO | WO 01/30618 | 5/2001 |
| WO | WO 01/40034 | 6/2001 |
| WO | WO 01/49537 | 7/2001 |
| WO | WO 01/58732 | 8/2001 |
| WO | WO 01/62559 | 8/2001 |
| WO | WO 01/89890 | 11/2001 |
| WO | WO 01/89891 | 11/2001 |
| WO | WO 01/89892 | 11/2001 |
| WO | WO 01/94166 | 12/2001 |
| WO | WO 02/04168 | 1/2002 |
| WO | WO 02/04266 | 1/2002 |
| WO | WO 02/04267 | 1/2002 |
| WO | WO 02/04268 | 1/2002 |
| WO | WO 02/34590 | 5/2002 |
| WO | WO 02/34596 | 5/2002 |
| WO | WO 02/34597 | 5/2002 |
| WO | WO 02/40328 | 5/2002 |
| WO | WO 02/40329 | 5/2002 |
| WO | WO 02/051677 | 7/2002 |
| WO | WO 02/052917 | 7/2002 |
| WO | WO 02/066301 | 8/2002 |
| WO | WO 02/090155 | 11/2002 |
| WO | WO 02/090156 | 11/2002 |
| WO | WO 03/026938 | 4/2003 |
| WO | WO 03/033316 | 4/2003 |
| WO | WO 03/042017 | 5/2003 |
| WO | WO 03/045746 | 6/2003 |
| WO | WO 03/091078 | 11/2003 |
| WO | WO 03/101794 | 12/2003 |
| WO | WO 03/106233 | 12/2003 |
| WO | WO 2004/002792 | 1/2004 |
| WO | WO 2004/045927 | 6/2004 |
| WO | WO 2004/045928 | 6/2004 |
| WO | WO 2004/048163 | 6/2004 |
| WO | WO 2004/056625 | 7/2004 |
| WO | WO 2004/069617 | 8/2004 |
| WO | WO 2004/076251 | 9/2004 |
| WO | WO 2004/098962 | 11/2004 |
| WO | WO 2004/098963 | 11/2004 |
| WO | WO 2004/110833 | 12/2004 |
| WO | WO 2005/025956 | 3/2005 |
| WO | WO 2005/039944 | 5/2005 |
| WO | WO 2008/051483 | 5/2005 |
| WO | WO 2005/054017 | 6/2005 |
| WO | WO 2005/080160 | 9/2005 |
| WO | WO 2005/082691 | 9/2005 |
| WO | WO 2005/087560 | 9/2005 |
| WO | WO 2005/092680 | 10/2005 |
| WO | WO 2005/102801 | 11/2005 |
| WO | WO 2005/115813 | 12/2005 |
| WO | WO 2005/123471 | 12/2005 |
| WO | WO 2006/000393 | 1/2006 |
| WO | WO 2006/013152 | 2/2006 |
| WO | WO 2006/040259 | 4/2006 |
| WO | WO 2006/048355 | 5/2006 |
| WO | WO 2006/061284 | 6/2006 |
| WO | WO 2006/069648 | 7/2006 |
| WO | WO 2006/074995 | 7/2006 |
| WO | WO 2006/079591 | 8/2006 |
| WO | WO 2006/081893 | 8/2006 |
| WO | WO 2006/106006 | 10/2006 |

(56) References Cited

FOREIGN PATENT DOCUMENTS

| | | |
|---|---|---|
| WO | WO 2006/106109 | 10/2006 |
| WO | 2006119679 A1 | 11/2006 |
| WO | WO 2006/114355 | 11/2006 |
| WO | WO 2006/117081 | 11/2006 |
| WO | WO 2006/117085 | 11/2006 |
| WO | WO 2006/117308 | 11/2006 |
| WO | WO 2007/009885 | 1/2007 |
| WO | WO 2007/014389 | 2/2007 |
| WO | WO 2007/014395 | 2/2007 |
| WO | WO 2007/035288 | 3/2007 |
| WO | WO 2007/042377 | 4/2007 |
| WO | WO 2007/045549 | 4/2007 |
| WO | WO 2007/071487 | 6/2007 |
| WO | WO 2007/073974 | 7/2007 |
| WO | WO 2007/102404 | 9/2007 |
| WO | WO 2007/122095 | 11/2007 |
| WO | WO 2007/128677 | 11/2007 |
| WO | WO 2008/003633 | 1/2008 |
| WO | WO 2008/043622 | 4/2008 |
| WO | WO 2008/076402 | 6/2008 |
| WO | WO 2008/122453 | 10/2008 |
| WO | WO 2008/124113 | 10/2008 |
| WO | WO 2008/135308 | 11/2008 |
| WO | WO 2009/000498 | 12/2008 |
| WO | WO 2009/115494 | 9/2009 |
| WO | WO 2009/121849 | 10/2009 |
| WO | WO 2009/124792 | 10/2009 |
| WO | WO 2009/132982 | 11/2009 |
| WO | WO 2009/153097 | 12/2009 |
| WO | WO 2009/155230 | 12/2009 |
| WO | WO 2010/016000 | 2/2010 |
| WO | WO 2010/028866 | 3/2010 |
| WO | WO 2010/028918 | 3/2010 |
| WO | WO 2010033646 | 3/2010 |
| WO | WO 2010/034445 | 4/2010 |
| WO | WO 2010/034447 | 4/2010 |
| WO | WO 2010/035794 | 4/2010 |
| WO | WO 2010/091757 | 8/2010 |
| WO | WO 2010/098877 | 9/2010 |
| WO | WO 2010/112579 | 10/2010 |
| WO | WO 2010/121665 | 10/2010 |
| WO | 2010127888 A1 | 11/2010 |
| WO | WO 2011/032753 | 3/2011 |
| WO | WO 2011/032760 | 3/2011 |
| WO | WO 2011/040743 | 4/2011 |
| WO | WO 2011/060979 | 5/2011 |
| WO | WO 2011/116995 | 9/2011 |
| WO | WO 2011/120723 | 10/2011 |
| WO | WO 2011/124404 | 10/2011 |
| WO | WO 2011/131395 | 10/2011 |
| WO | WO 2011/144400 | 11/2011 |
| WO | WO 2011/157465 | 12/2011 |
| WO | WO 2012/001175 | 1/2012 |
| WO | WO 2012/014054 | 2/2012 |
| WO | WO 2012/033363 | 3/2012 |
| WO | 2013/016493 A1 | 1/2013 |
| WO | 2013/019645 A1 | 2/2013 |
| WO | 2013/019723 A1 | 2/2013 |
| WO | 2013089312 A1 | 6/2013 |
| WO | 2013/126910 A1 | 8/2013 |
| WO | 2013/128907 A1 | 8/2013 |
| WO | 13176352 A1 | 11/2013 |
| WO | 2014/145538 A1 | 9/2014 |
| WO | 2016/160687 A1 | 10/2016 |
| WO | 2017/075066 A1 | 5/2017 |
| ZA | 199710009 | 5/1999 |
| ZA | 199806123 | 1/2000 |
| ZA | 199806124 | 1/2000 |
| ZA | 199806125 | 1/2000 |
| ZA | 199807523 | 2/2000 |
| ZA | 200006220 B | 7/2001 |

OTHER PUBLICATIONS

International Search Report dated Oct. 19, 2012 for PCT/US2012/048843 filed Jul. 30, 2012.
International Search Report dated Sep. 19, 2012 for PCT/US2012/048617 filed Jul. 27, 2012.
International Search Report dated Sep. 19, 2012 for PCT/US2012/048262 filed Jul. 26, 2012.
Non-Final Rejection towards U.S. Appl. No. 13/453,601 dated Jul. 9, 2013.
Non-Final Rejection towards U.S. Appl. No. 13/453,601 dated Jan. 10, 2014.
Final Rejection towards U.S. Appl. No. 13/453,601 dated Aug. 1, 2014.
Non-Final Rejection towards U.S. Appl. No. 13/45,3601 dated Feb. 4, 2015.
Final Rejection towards U.S. Appl. No. 13/453,601 dated Jun. 3, 2015.
Non-Final Rejection towards U.S. Appl. No. 13/453,601 dated Jan. 8, 2016.
Notice of Allowance towards U.S. Appl. No. 13/453,601 dated May 20, 2016.
Non-Final Rejection towards U.S. Appl. No. 13/558,624 dated May 16, 2014.
Final Rejection towards U.S. Appl. No. 13/558,624 dated Sep. 29, 2014.
Non-Final Rejection towards U.S. Appl. No. 13/558,624 dated Mar. 6, 2015.
Notice of Allowance towards U.S. Appl. No. 13/558,624 dated Jun. 29, 2015.
Non-Final Rejection towards U.S. Appl. No. 13/560,585 dated Jul. 29, 2014.
Filial Rejection Towards U.S. Appl. No. 13/560,585 dated Jan. 28, 2015.
Non-Final Rejection towards U.S. Appl. No. 13/560,585 dated Jun. 24, 2015.
Notice of Allowance towards U.S. Appl. No. 13/560,585 dated Mar. 22, 2016.
Non-Final Rejection towards U.S. Appl. No. 13/679,646 dated Feb. 2, 2015.
Final Rejection towards U.S. Appl. No. 13/679,646 dated Sep. 2, 2015.
Non-Final Rejection towards U.S. Appl. No. 13/679,646 dated Jun. 13, 2016.
Non-Final Rejection towards U.S. Appl. No. 13/679,646 dated Jan. 4, 2017.
Non-Final Rejection towards U.S. Appl. No. 13/572,100 dated Jun. 3, 2014.
Non-Final Rejection towards U.S. Appl. No. 13/587,389 dated Oct. 31, 2014.
Final Rejection towards U.S. Appl. No. 13/587,389 dated Feb. 25, 2015.
Notice of Allowance towards U.S. Appl. No. 13/587,389 dated Jun. 19, 2015.
Non-Final Rejection towards U.S. Appl. No. 13/194,070 dated Apr. 8, 2013.
Final Rejection towards U.S. Appl. No. 13/194,070 dated Aug. 27, 2013.
Non-Final Rejection towards U.S. Appl. No. 13/194,070 dated Dec. 26, 2013.
Notice of Allowance towards U.S. Appl. No. 13/194,070 dated Apr. 18 2014.
Non-Final Rejection towards U.S. Appl. No. 14/329423 dated Sep. 10, 2014.
Notice of Allowance towards U.S. Appl. No. 14/329,423 dated Apr. 15 2015.
Non-Final Rejective towards U.S. Appl. No. 29/413,428 dated Nov. 7, 2012.
Notice of Allowance towards U.S. Appl. No. 29/413,428 dated Jun. 14, 2013.
Notice of Allowance towards U.S. Appl. No. 29/413,430 dated Nov. 26, 2012.
Non-Final Rejection towards U.S. Appl. No. 29/375,477 dated Sep. 7, 2012.

(56) References Cited

OTHER PUBLICATIONS

Notice of Allowance towards U.S. Appl. No. 29/375,477 dated Jan. 15, 2014.
Notice of Allywdliee towards U.S. Appl. No. 29/429,262 dated Jun. 27, 2013.
Non-Final Rejection towards U.S. Appl. No. 14/035,610 dated Apr. 22, 2016.
Final Rejection towards U.S. Appl. No. 14/035,610 dated Aug. 5, 2016.
Non-Final Rejection towards U.S. Appl. No. 14/035,610 dated Dec. 30, 2016.
Non-Final Rejection towards U.S. Appl. No. 13/776,376 dated Nov. 18, 2014.
Non-Final Rejection towards U.S. Appl. No. 13/840,256 dated Nov. 26, 2014.
Non-Final Rejection towards U.S. Appl. No. 14/715,180 dated Jan. 7, 2016.
Final Rejection towards U.S. Appl. No. 14/715,180 dated Aug. 16, 2016.
Definition of rectangular in Oxford Dictionary 2017.
Non-Final Rejection towards U.S. Appl. No. 14/715,180 dated May 22, 2017.
Non-Final Rejection towards U.S. Appl. No. 14/721,476 dated May 16, 2017.
International Search Report and Written Opinion issued in PCT Application No. PCT/US2013/027684 dated Apr. 29, 2013.
International Search Report and Written Opinion issued in PCT Application No. PCT/US2014/030329 dated Jun. 3, 2014.
First Office Action issued in connection with CA Application No. 2865292 dated Aug. 25, 2015.
Second Office Action issued in connection with CA Application No. 2865292 dated Aug. 15, 2016.
Non-Final Rejection towards U.S. Appl. No. 13/776,383 dated Mar. 10, 2015.
Final Rejection towards U.S. Appl. No. 13/776,383 dated Aug. 14, 2015.
International Search Report and Written Opinion issued in PCT Application No. PCT/US2013/027688 dated Apr. 25, 2013.
First Office Action issued in connection with CA Application No. 2865295 on Aug. 25, 2015.
Non-Final Rejection towards U.S. Appl. No. 14/216,082 dated Apr. 12, 2017.
Non-Final Rejection towards U.S. Appl. No. 14/200792 dated Otc. 23, 2015.
Final Rejection towards U.S. Appl. No. 14/200,792 dated Feb. 23, 2016.
Notice of Allowance issued towards U.S. Appl. No. 14/200,792 dated Jul. 22, 2016.
Non-Final Rejection towards U.S. Appl. No. 15/359,271 dated May 11, 2017.
Notice of Allowance issued towards application 29/504,287 dated Sep. 12, 2016.
Non-Final Rejection towards U.S. Appl. No. 29/504,292 dated Jun. 19, 2015.
Final Rejection towards U.S. Appl. No. 29/504,292 dated Jan. 20, 2016.
Advisory Action towards U.S. Appl. No. 29/504,292 dated May 19, 2016.
Notice of Allowance issued towards U.S. Appl. No. 29/504,292 dated Aug. 16, 2016.
International Search Report and Written Opinion issued in PCT Application No. PCT/US2016/024490 dated Jun. 21, 2016.
Notice of Allowance issued towards U.S. Appl. No. 29/525,746 dated Apr. 7, 2016.
Notice of Allowance issued towards U.S. Appl. No. 29/571,419 dated Jan. 31, 2017.
Notice of Allowance issued towards U.S. Appl. No. 29/571,424 dated Feb. 1, 2017.
International Search Report and Written Opinion issued in PCT Application No. PCT/US2016/058887 dated Jan. 3, 2017.

* cited by examiner

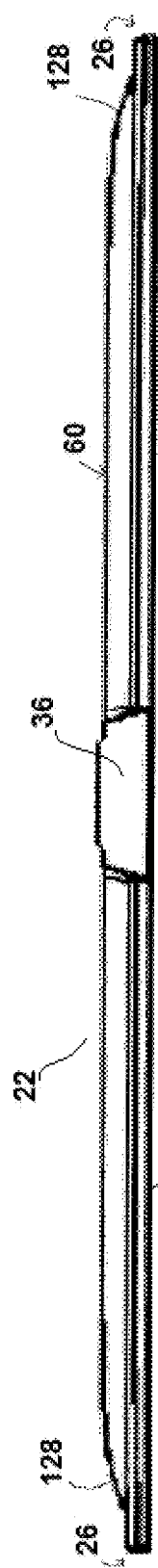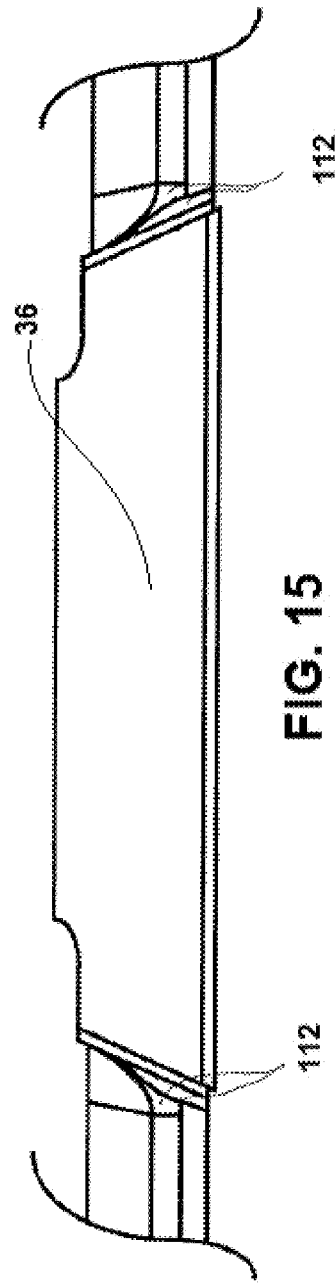

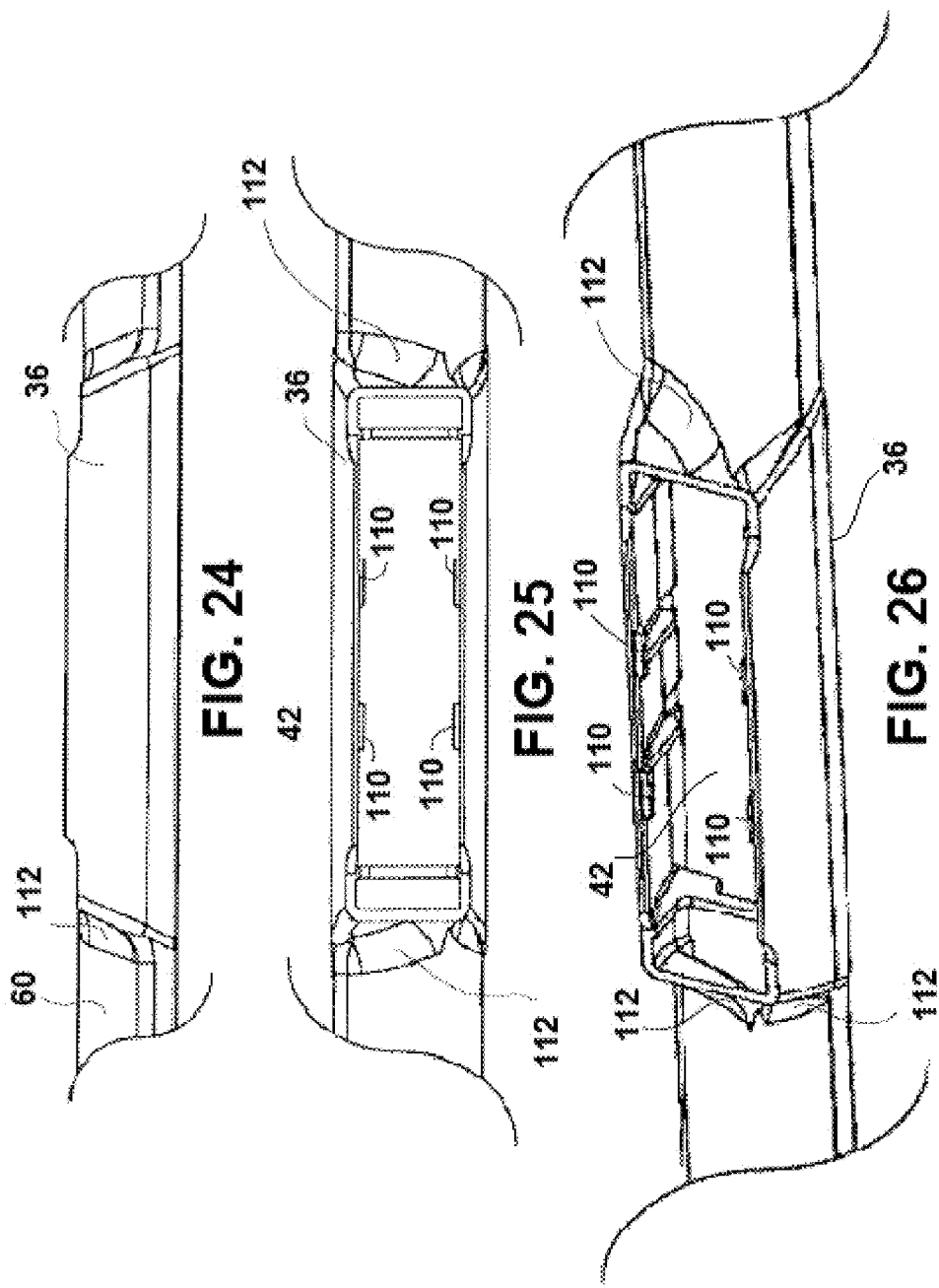

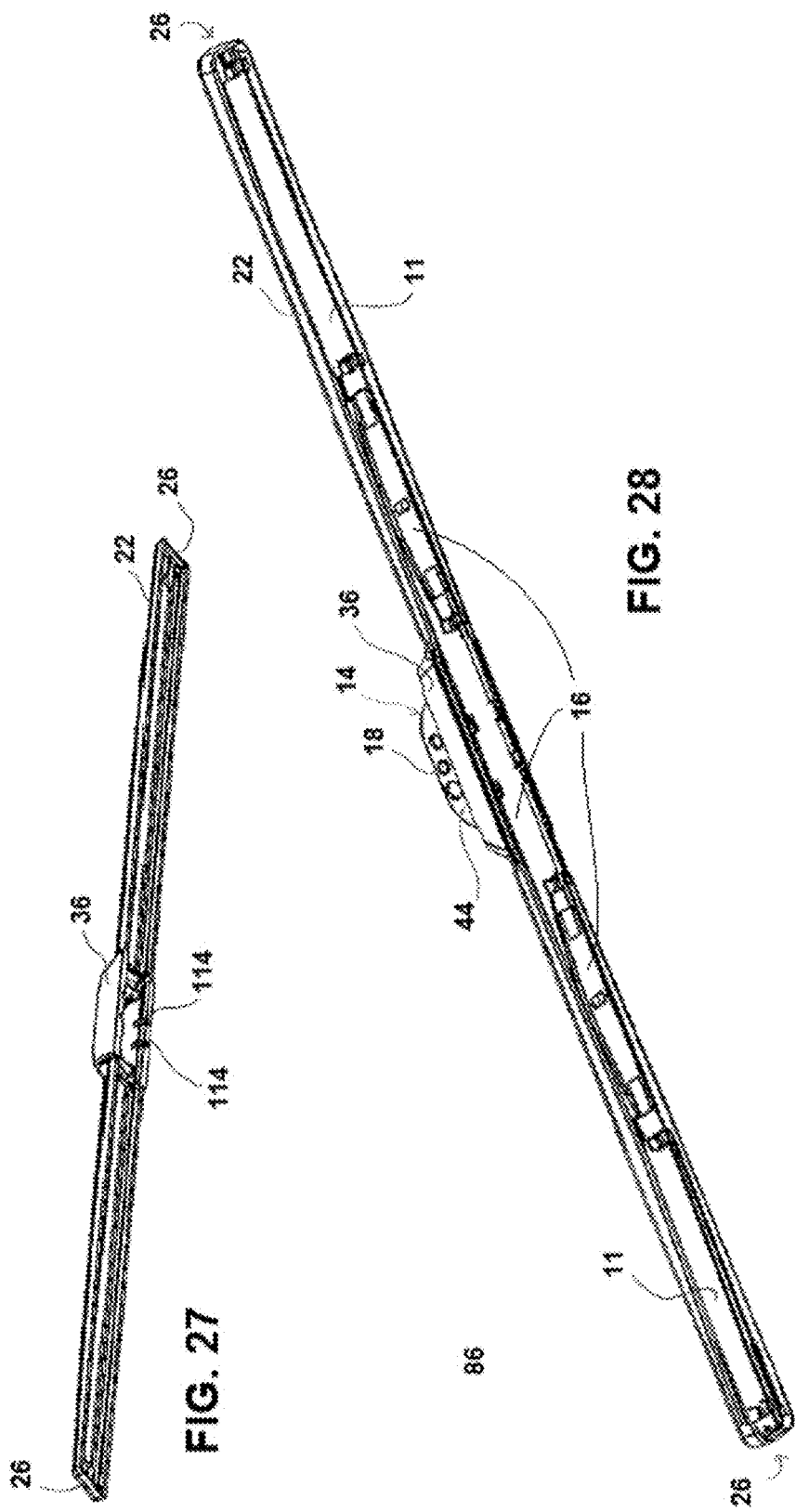

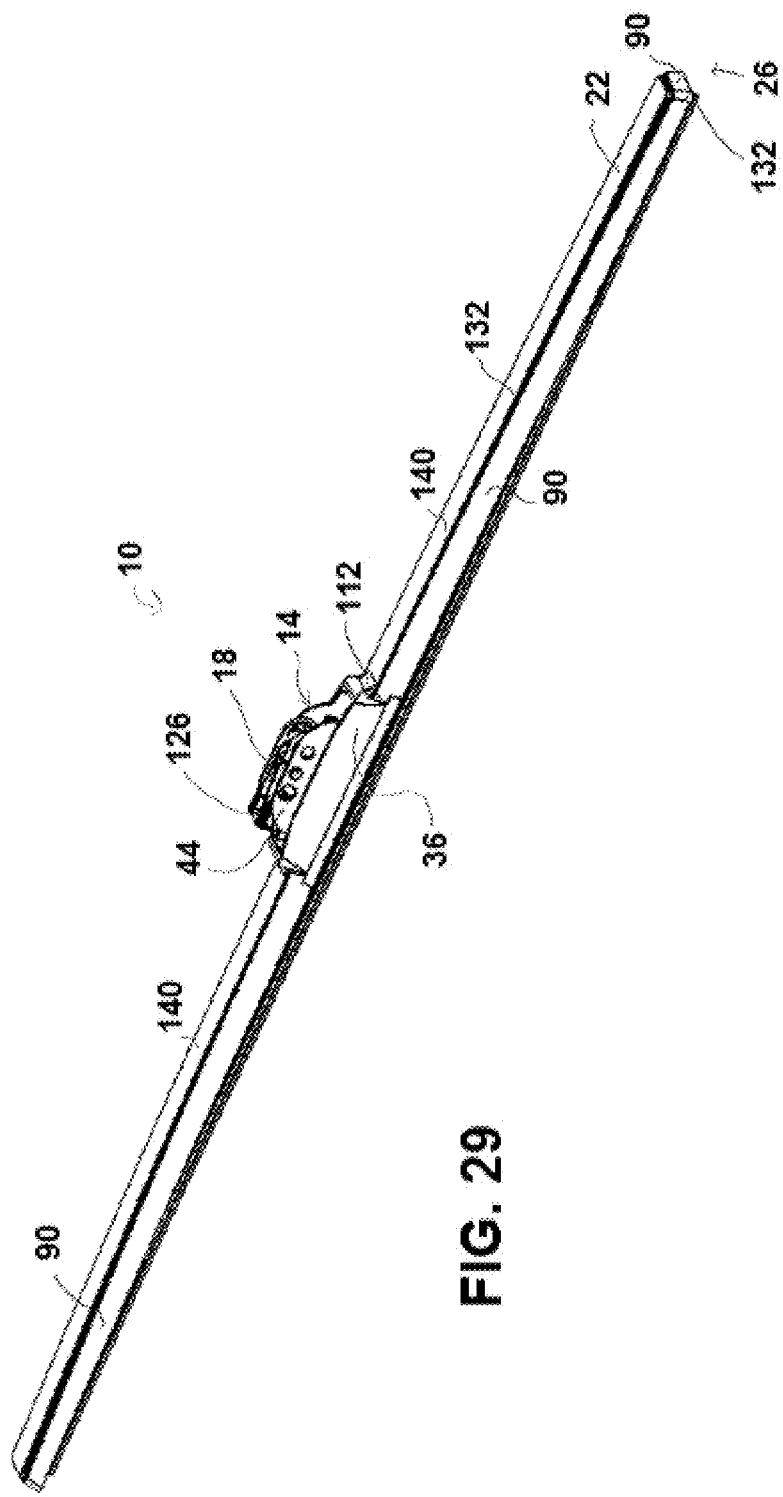

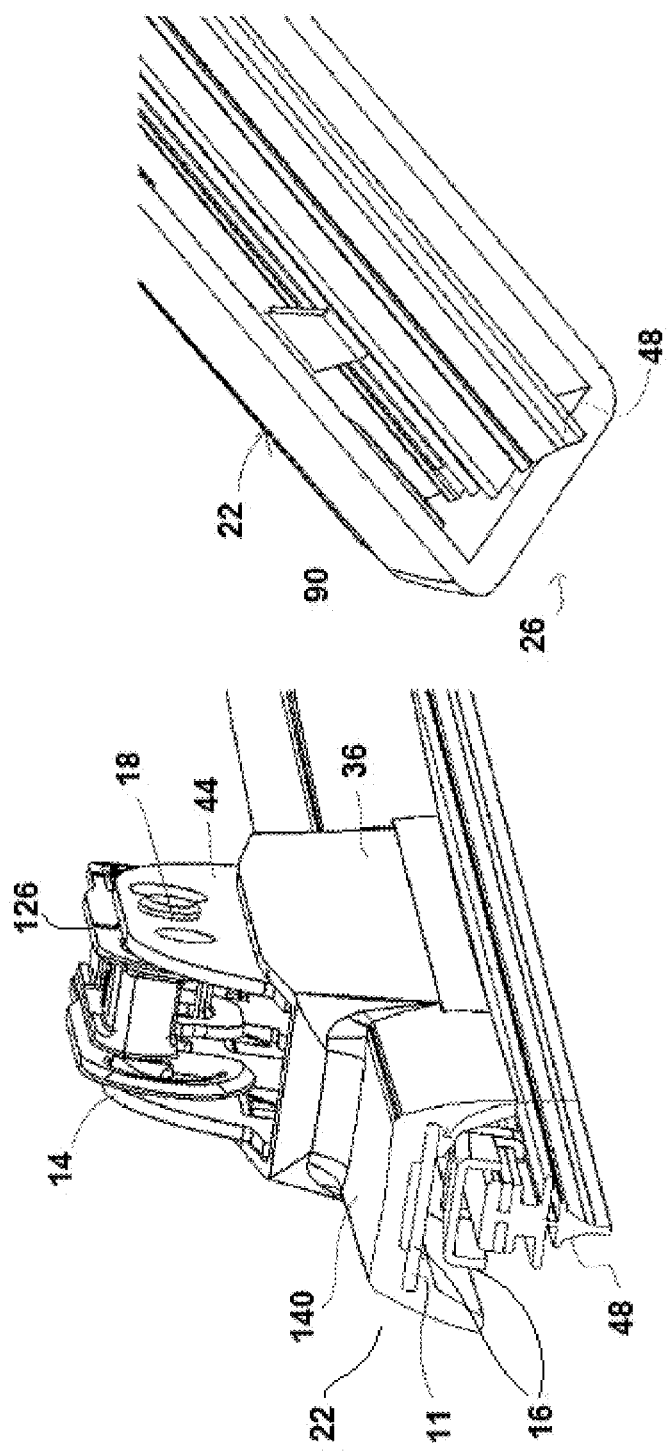

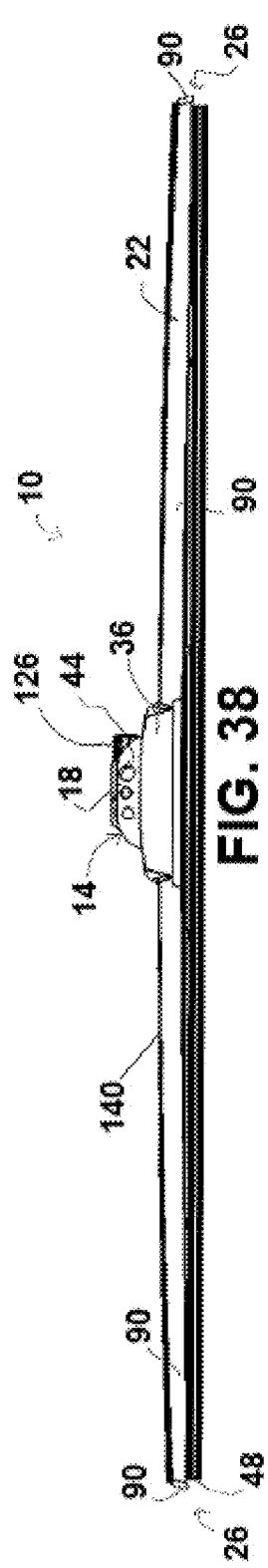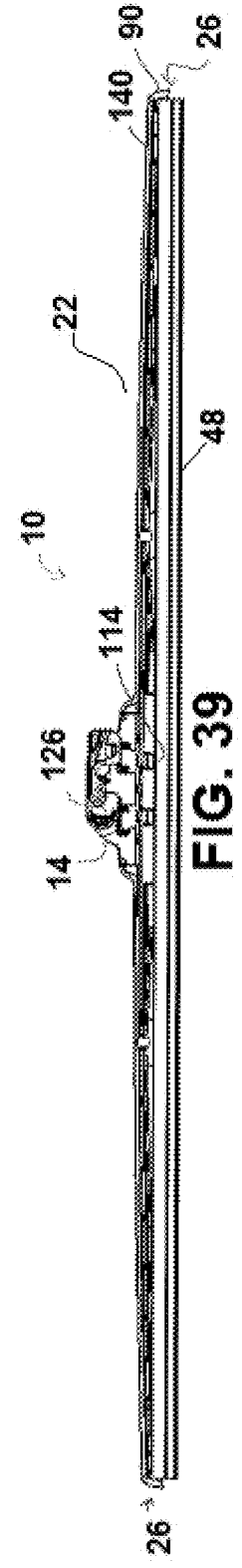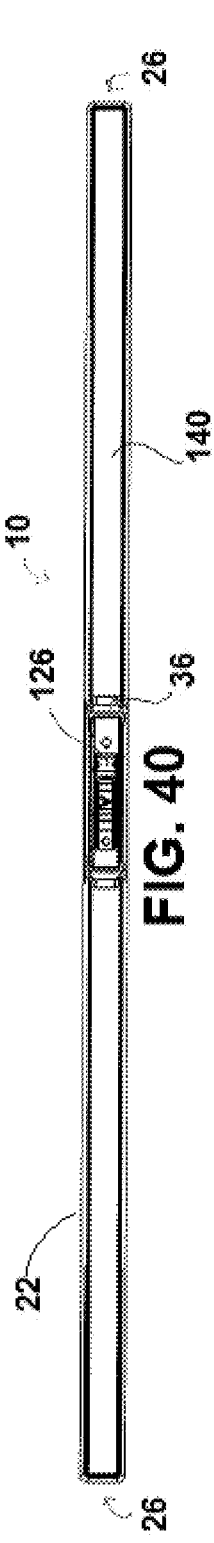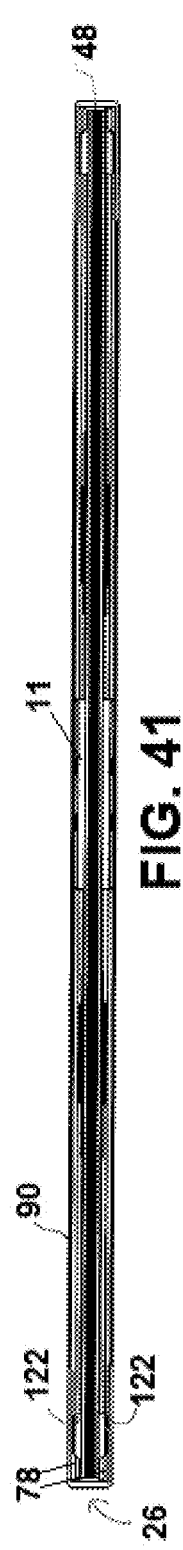

WIPER BLADE WITH COVER

CROSS-REFERENCE TO RELATED APPLICATIONS

This application is a continuation of U.S. application Ser. No. 13/587,389 filed on Aug. 16, 2012, which claims the benefit of U.S. Provisional Application No. 61/524,145 filed Aug. 16, 2011 and U.S. Provisional Application No. 61/561,098 filed Nov. 17, 2011 and is a continuation-in-part of U.S. patent application Ser. No. 13/572,100 filed Aug. 10, 2012 which claims the benefit of U.S. Provisional Application No. 61/522,091 filed Aug. 10, 2011 and U.S. Provisional Application No. 61/560,977 filed Nov. 17, 2011 and is also a continuation-in-part of U.S. patent application Ser. No. 13/453,601 filed Apr. 23, 2012 which claims the benefit of U.S. Provisional Application No. 61/477,908 filed Apr. 21, 2011. The disclosures of each of the aforementioned are hereby incorporated herein by reference in their entireties.

FIELD OF THE INVENTION

This invention relates to the field of windshield wiper blades having a covered portion.

BACKGROUND OF THE INVENTION

Basic windshield wipers used on vehicles have a blade portion that contacts the windshield, a frame that supports the wiper strip, and a connection device for attaching the blade to a wiper arm. Presently, three principle styles of windshield wipers are in wide-scale use. The first style is the traditional frame windshield wiper, which implements a multi-piece frame that is directly connected to the wiper arm. The second style is the beam blade windshield wiper, which has a unitary beam that supports the wiper blade and is directly connected to the wiper arm. Wiper blades of this type are described in U.S. Patent Application No. 61/477,908, which is incorporated by reference herein in its entirety. The third style is the hybrid blade windshield wiper, which combines the multi-piece frame and the unitary beam frame. Wiper blades of this type are described in U.S. Patent Publication No. US 2010/0236008, which is incorporated herein by reference in its entirety.

One problem common among many windshield wipers is a tendency to separate from the windshield during use, thus resulting in an uneven or inconsistent clearing of the windshield. This happens when a windshield wiper encounters a vehicle's slipstream and downward force on the wiper blade is overcome by wind lift created by the wiper blade. The wind lift problem has been known in the wiper field for decades, and many attempts have been made to resolve it. For example, see U.S. Pat. Nos. 3,056,991, 3,317,945, 3,879,793, 3,942,212, 6,292,974, 6,944,905, which are incorporated herein by reference in their entirety.

To minimize the wind lift problem, covers that create desired aerodynamic characteristics are added to the top of windshield wipers. Beam blade and hybrid blade windshield wipers generally incorporate three or more deflectors or covers. Specifically, a first cover is provided between one end of the windshield wiper and the central connection device. A second cover is provided between the other end of the windshield wiper and the central connection device. And a third cover is provided over the central connection device.

Despite the significant performance, aerodynamic and aesthetic improvements created by the use of covers, these windshield wipers still have significant shortcomings. One significant problem is that the use of covers increases the material and assembly costs for each windshield wiper. Another problem is that covers are prone to unwanted separation or detachment from the windshield wiper. Separation often occurs when the vehicle is moving through inclement weather and as a result covers are frequently lost. Once a cover is lost, the performance and aesthetic qualities of the windshield wiper are significantly impaired.

Yet another problem with windshield wipers, and in particular windshield wipers with covers, is that covers can result in high profile or interrupted profile regions. Such regions can create aerodynamic turbulence or vortices that result in wind noise. This occurs as wind contacts any high profile or interrupted profile regions of the covered windshield wiper. The wind noise created from wiper blades encountering the slip stream is distracting and makes for a less comfortable overall driving experience. Reduction of such wind noise is therefore a constant concern associated with wiper blade design.

BRIEF SUMMARY OF THE INVENTION

The foregoing problems of prior windshield wipers are resolved or at least substantially reduced and a technical advance is achieved in a windshield wiper that reduces or eliminates windshield wiper cover separation, high profile or interrupted profile regions.

According to one embodiment of the present invention, a windshield wiper having an elongate cover with an elastomeric region and a central collar is provided. The central collar is mounted over a mounting base, or other connection device of the windshield wiper. In addition, the elongate cover is provided with attachment mechanisms at its ends to secure the ends to corresponding ends of the windshield wiper.

According to another embodiment of the present invention, a windshield wiper having aerodynamically contoured cover with an elastomeric region and an aerodynamically contoured central collar is provided. The central collar is mounted over a mounting base, or other connection device of the windshield wiper. In addition, the aerodynamically contoured cover is provided with contoured attachment mechanisms at its ends to secure the ends to corresponding ends of the windshield wiper.

According to yet another embodiment of the present invention, a windshield wiper having a cover defining a substantially planar upper region and rectilinear seams connecting the upper region to a planar skirt. The cover is further provided with an elastomeric region and a central collar. The central collar is mounted over a mounting base, or other connection device of the windshield wiper. In addition, the cover is provided with chop attachment mechanisms at its ends to secure the ends to corresponding ends of the windshield wiper.

Exemplary embodiments of windshield wipers having an elongate cover with a central collar are attached hereto as examples of the invention.

BRIEF DESCRIPTION OF THE DRAWINGS

FIG. 14 illustrates a side view of a first embodiment of an elongate windshield wiper cover according to one aspect of the present invention;

FIG. 15 illustrates a cutaway side view of a second embodiment of an elongate windshield wiper cover according to one aspect of the present invention;

FIG. 24 illustrates a cutaway side view of a third embodiment of an elongate windshield wiper cover according to one aspect of the present invention;

FIG. 25 illustrates a cutaway top view of a third embodiment of a windshield wiper cover according to one aspect of the present invention;

FIG. 26 illustrates a cutaway perspective view of a third embodiment of a windshield wiper cover according to one aspect of the present invention;

FIG. 27 illustrates a perspective bottom view of a third embodiment of a windshield wiper cover according to one aspect of the present invention;

FIG. 28 illustrates a perspective bottom view of a third embodiment of a hybrid windshield wiper according to one aspect of the present invention;

FIG. 29 illustrates a perspective side view of a fourth embodiment of an elongate windshield wiper according to one aspect of the present invention;

FIG. 36 illustrates a cutaway perspective side view of a fourth embodiment of a windshield wiper having a collar according to one aspect of the present invention;

FIG. 37 illustrates a cutaway perspective bottom view of a fourth embodiment of a windshield wiper cover end according to one aspect of the present invention;

FIG. 38 illustrates a side view of a fourth embodiment of a windshield wiper according to one aspect of the present invention;

FIG. 39 illustrates a cross-section side view of a fourth embodiment of a windshield wiper according to one aspect of the present invention;

FIG. 40 illustrates a top view of a fourth embodiment of a windshield wiper according to one aspect of the present invention; and FIG. 41 illustrates a bottom view of a fourth embodiment of a windshield wiper according to one aspect of the present invention.

DETAILED DESCRIPTION OF THE INVENTION

The following detailed description and the appended drawings describe and illustrate exemplary embodiments of the invention solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

Figure 4:
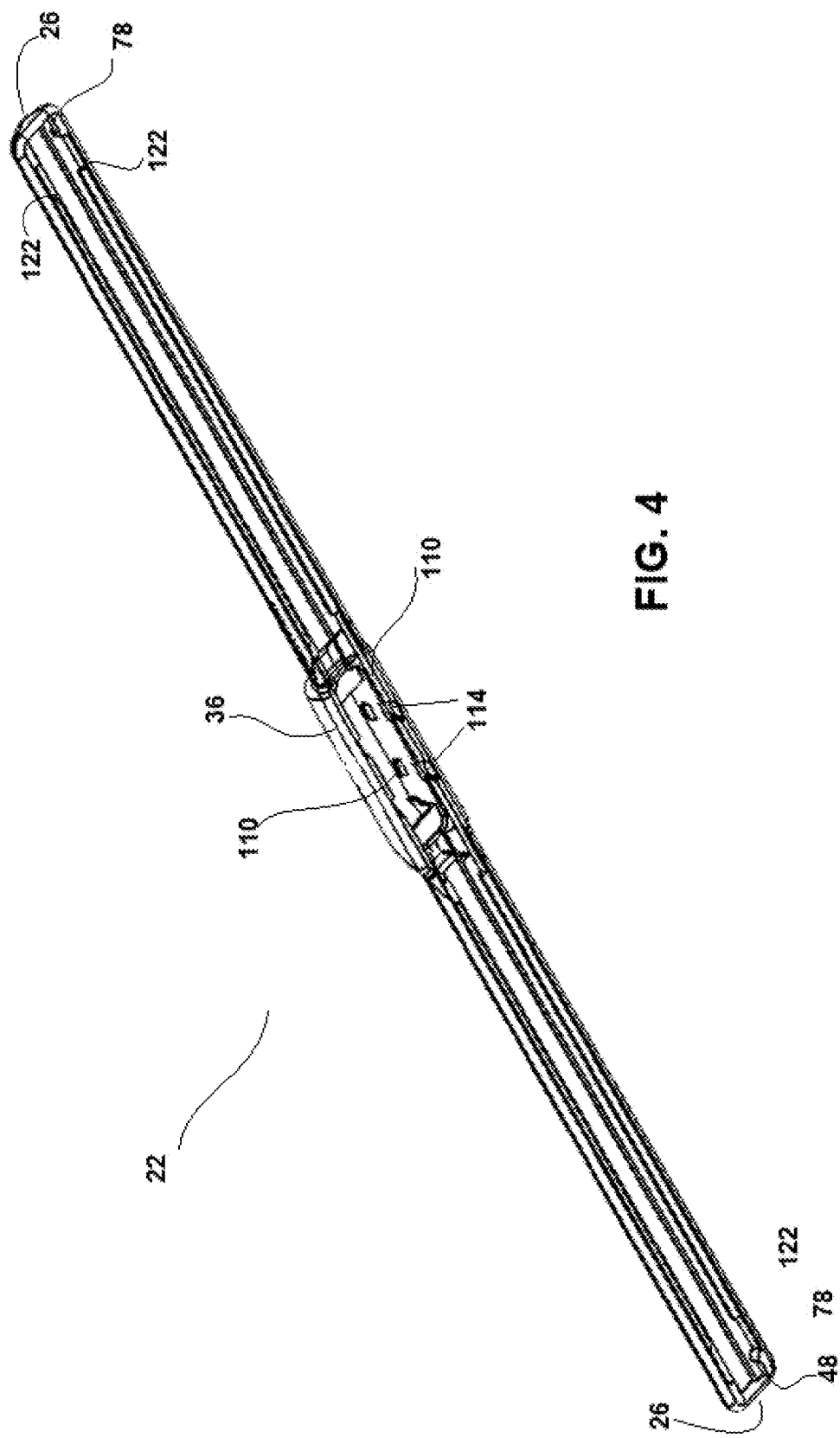
FIG. 4 illustrates a perspective bottom view of a first embodiment of an elongate windshield wiper cover according to one aspect of the present invention.
Figure 6:
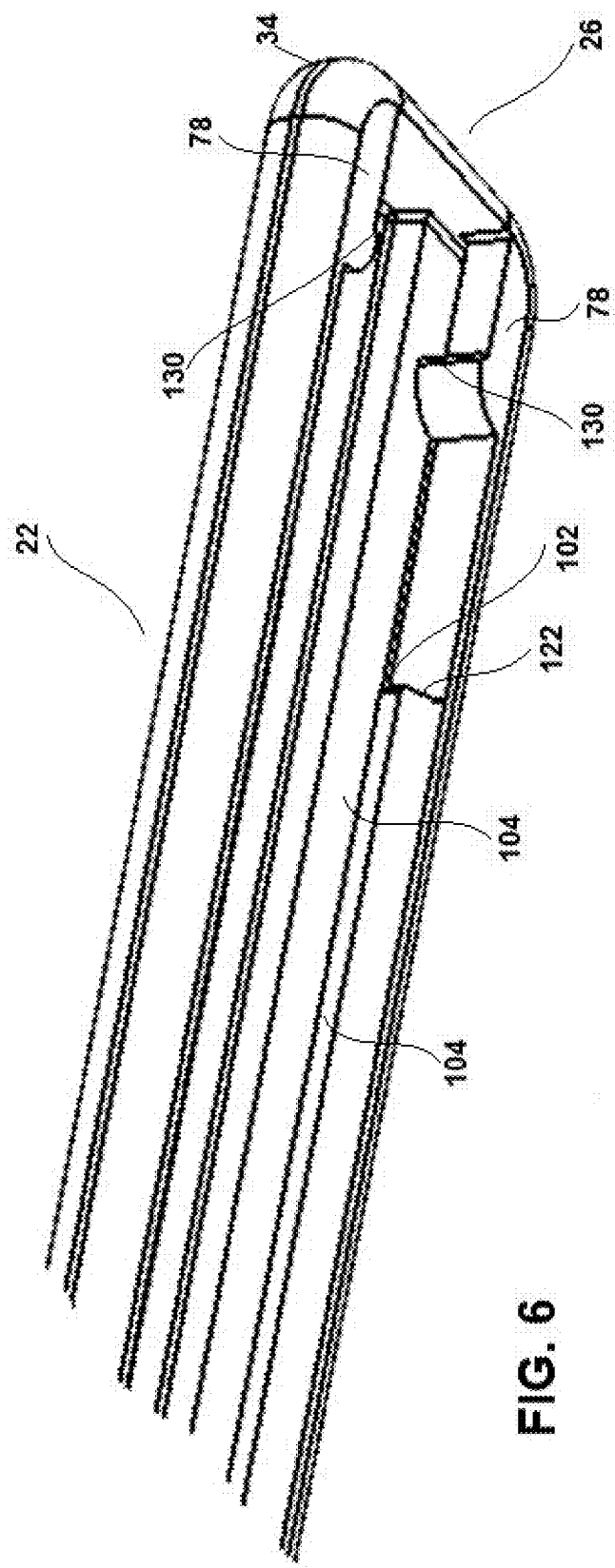
FIG. 6 illustrates a cutaway perspective bottom view of a first embodiment of an elongate windshield wiper cover end according to one aspect of the present invention.

Referring to the drawings in general, a wiper blade 10 includes a cover 22, a wiper frame assembly 16, a wiper strip 48, mounting base, or other connection device 14, and a raised portion 60. At a central region of cover 22, an integrated collar 36 defines a passageway for receiving the mounting base or other connection device 14. Collar 36 may also has recesses 114 or projections 110 for securing the collar to mounting base, or other connection device 14. The mounting base or other connection device 14, in turn, may secure the wiper blade to a connector 126 and/or adapter and driver arm (not shown) that actuates the wiper blade. Alternatively a connection device 14 may be designed to connect directly to a driver arm. As shown in FIGS. 4 and 6, cover 22 is also provided with end retainers 78. End retainers 78 are used to secure cover ends 26 to the wiper assembly frame 16. As shown in FIGS. 11-12 and 40-41, cover 22 forms a contiguous outer edge or perimeter 56 formed by front edge 32, left end 40, rear edge 34, and right end 36.

Figure 1:
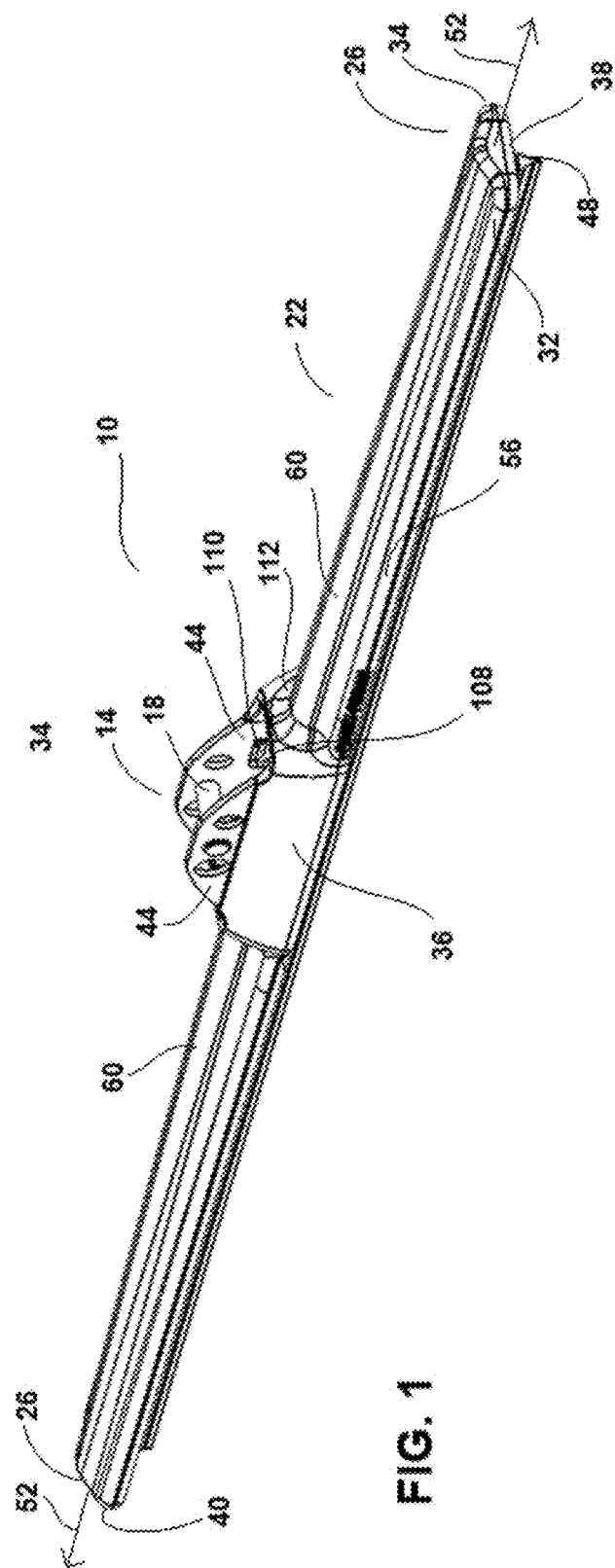
FIG. 1 illustrates a perspective side view of a first embodiment of a windshield wiper having an elongate windshield wiper cover according to one aspect of the present invention.
Figure 2:
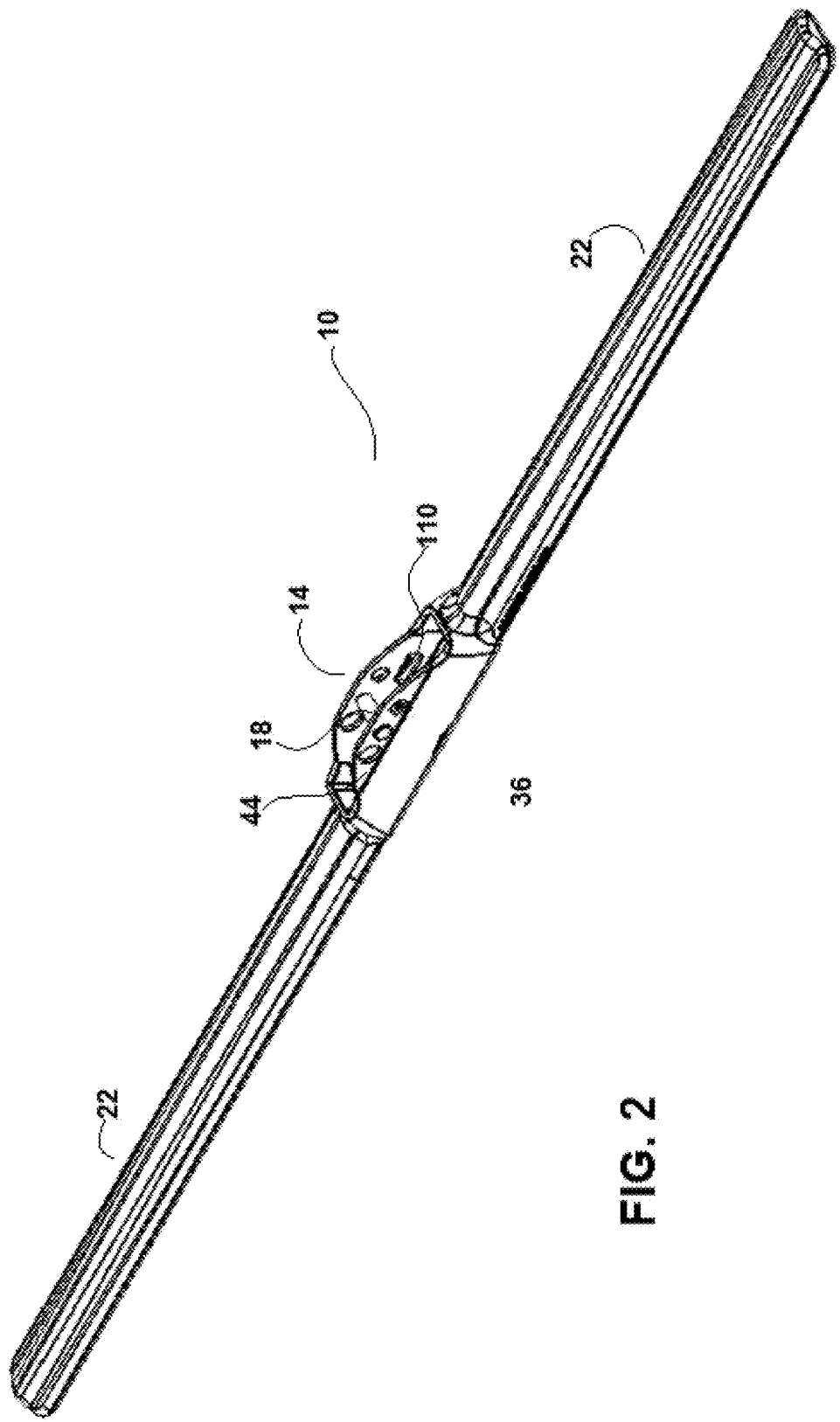
FIG. 2 illustrates a perspective side view of a first embodiment of a windshield wiper having an elongate windshield wiper cover illustrated without a wiper strip according to one aspect of the present invention.
Figure 3:
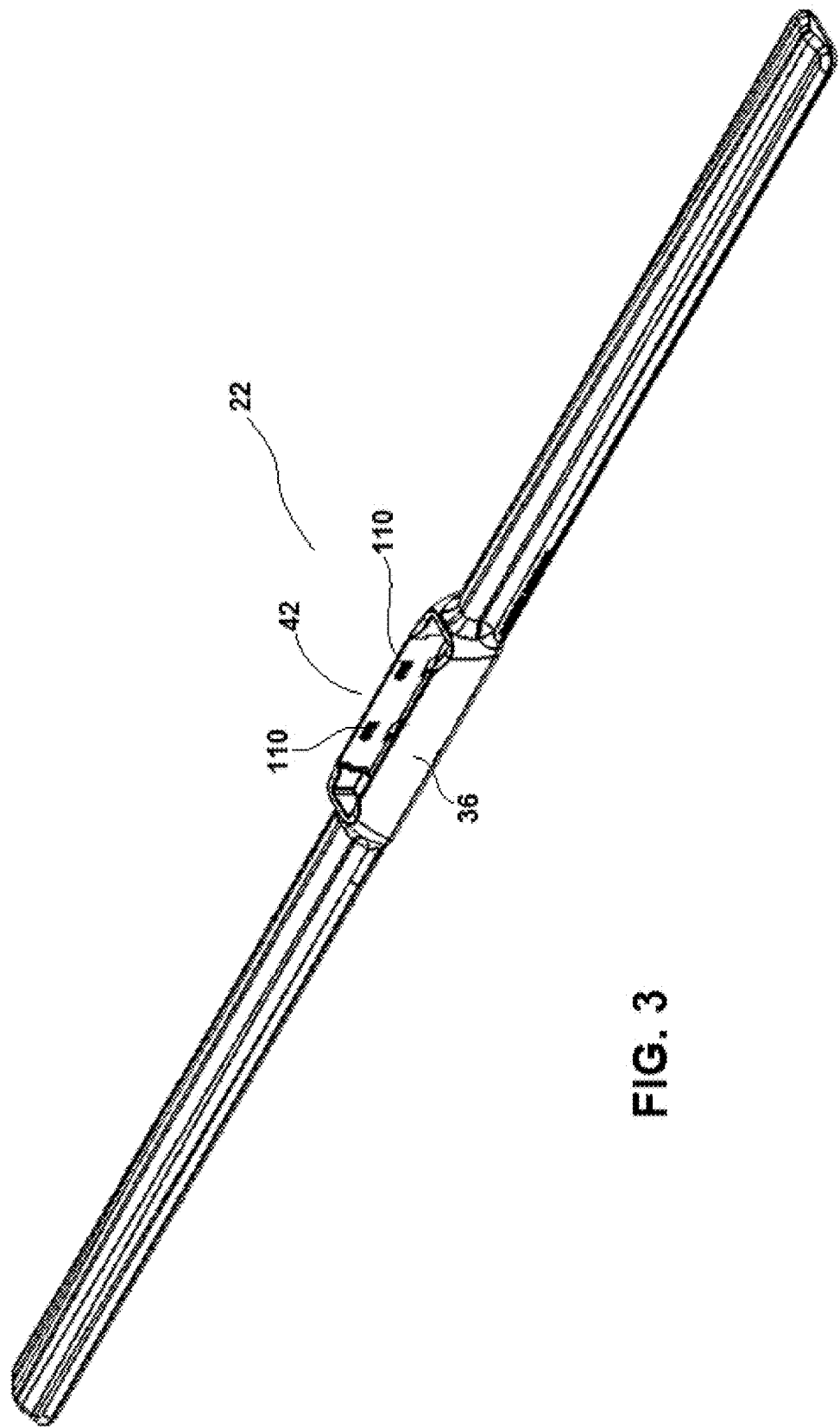
FIG. 3 illustrates a perspective side view of a first embodiment of an elongate windshield wiper cover according to one aspect of the present invention.
Figure 7:
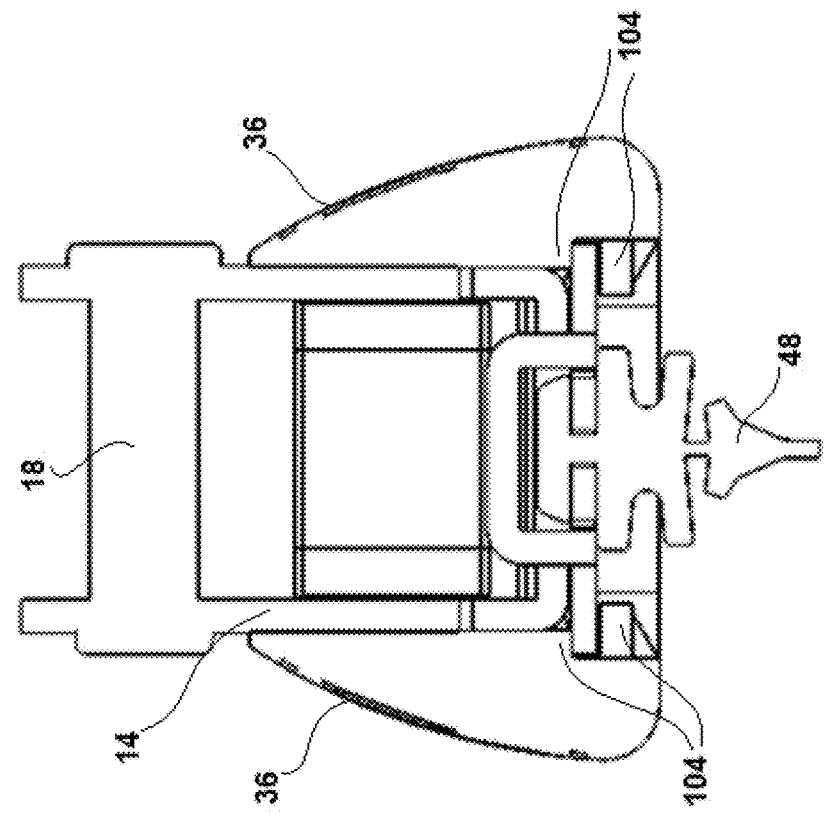
FIG. 7 illustrates a side view of a first embodiment of a windshield wiper having an elongate windshield wiper cover according to one aspect of the present invention.
Figure 8:
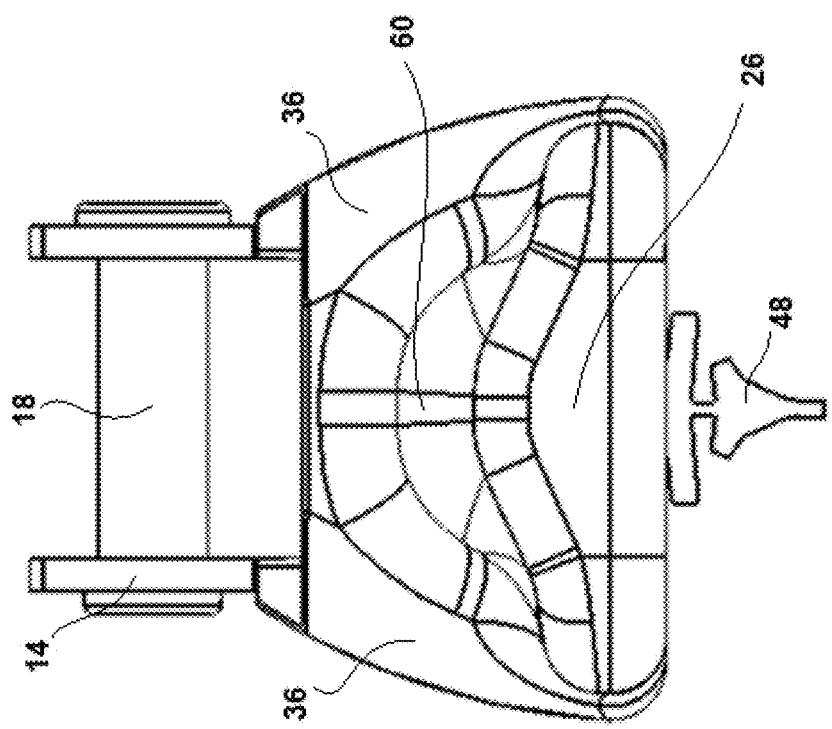
FIG. 8 illustrates a cross-section side view of a first embodiment of a windshield wiper according to one aspect of the present invention.
Figure 9:
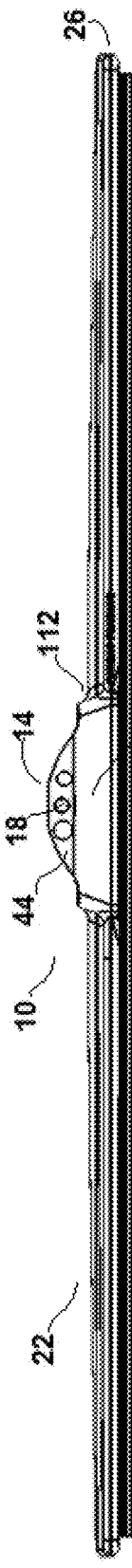
FIG. 9 illustrates a side view of a first embodiment of a windshield wiper having an elongate windshield wiper cover according to one aspect of the present invention.
Figure 10:
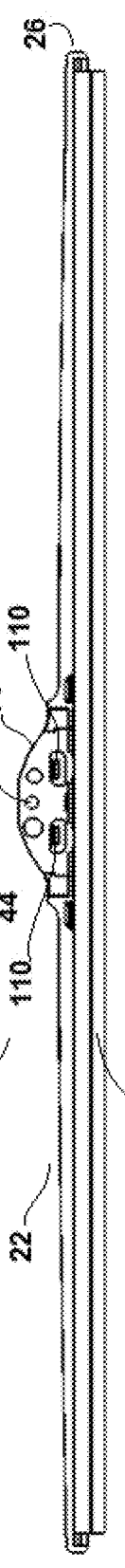
FIG. 10 illustrates a cross-section side view of a first embodiment of an elongate windshield wiper according to one aspect of the present invention.
Figure 11:
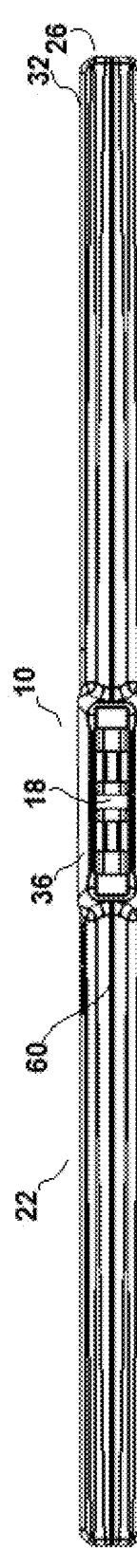
FIG. 11 illustrates a top view of a first embodiment of an elongate windshield wiper according to one aspect of the present invention.
Figure 12:
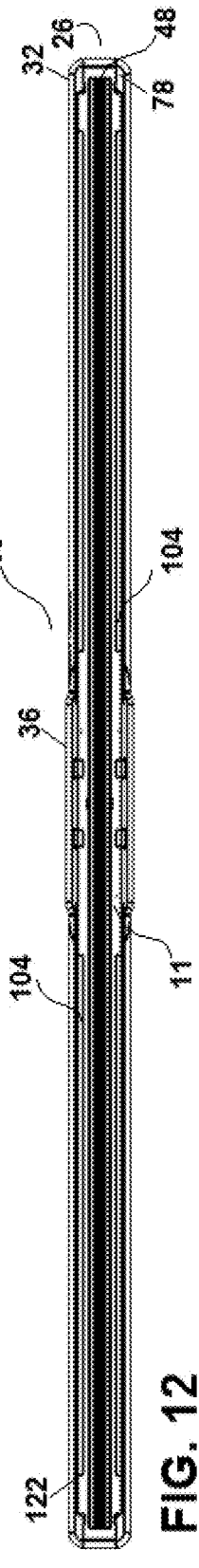
FIG. 12 illustrates a bottom view of a first embodiment of an elongate windshield wiper according to one aspect of the present invention.

FIGS. 1-12 illustrate a low profile embodiment of a wiper blade having a wiper cover with a central collar. In particular, as shown in FIG. 1, windshield wiper 10 has an elongate windshield wiper cover 22 that extends along a longitudinal axis 52. Between each end 26 and collar 36, the upper surface of cover 22 is cambered along its width, thereby reducing or limiting the formation of air vortices, as best illustrated in FIGS. 2, 3 and 7. Further, the cambered surface gently extends upwardly from a relatively low profile at the ends 26 to a steep upward slope 112 at collar 36.

Figure 5:
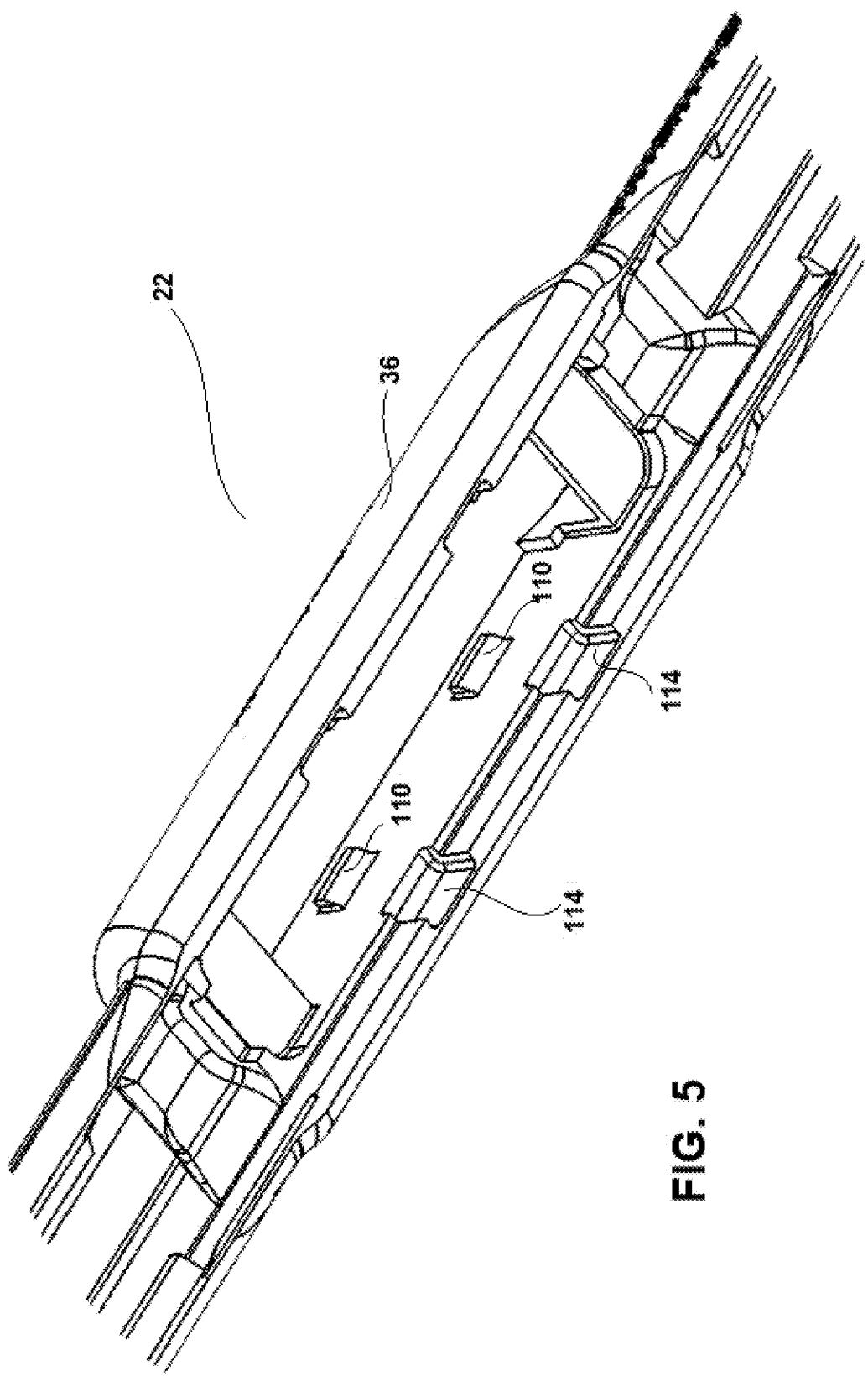
FIG. 5 illustrates a cutaway perspective bottom view of a first embodiment of an elongate windshield wiper cover having a collar according to one aspect of the present invention.
Figure 16:
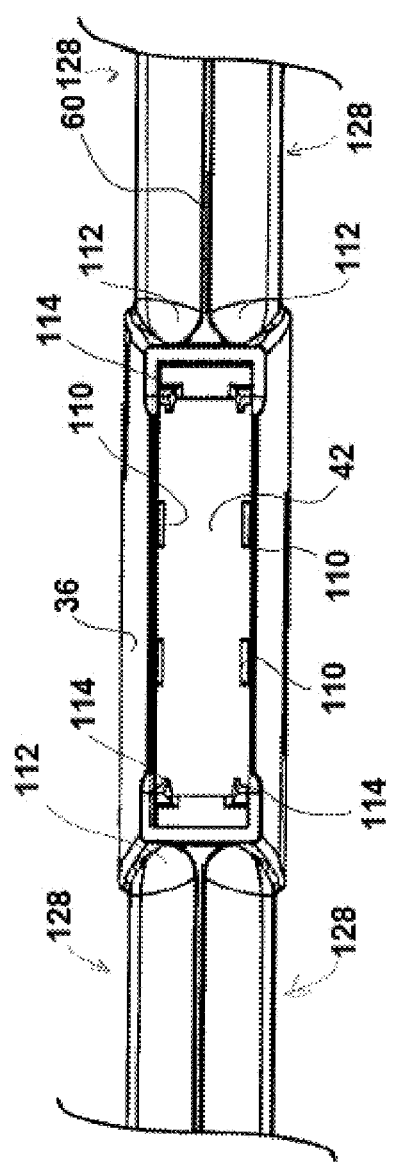
FIG. 16 illustrates a cutaway top view of a second embodiment of an elongate windshield wiper cover according to one aspect of the present invention.
Figure 17:
FIG. 17 illustrates a top view of a second embodiment of an elongate windshield wiper according to one aspect of the present invention.
Figure 18:
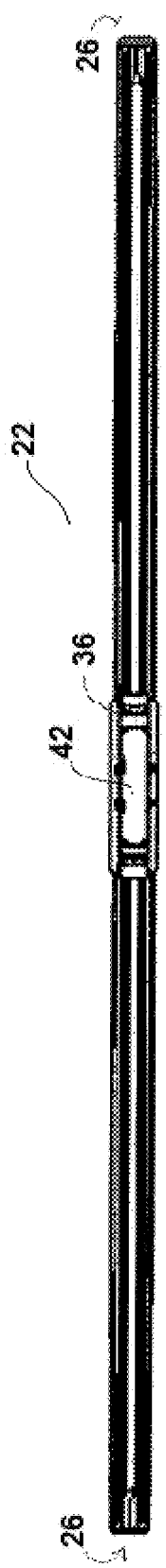
FIG. 18 illustrates a bottom view of a second embodiment of an elongate windshield wiper according to one aspect of the present invention.
Figure 19:
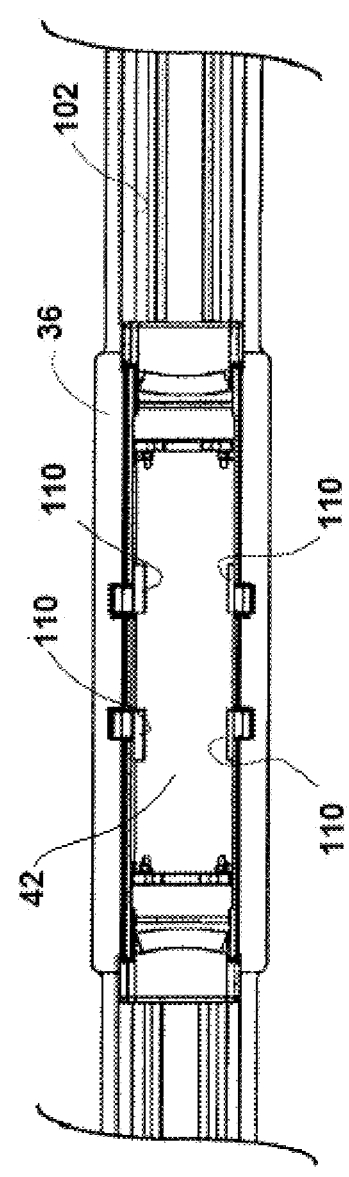
FIG. 19 illustrates a cutaway bottom view of a second embodiment of an elongate windshield wiper cover according to one aspect of the present invention.
Figure 20:
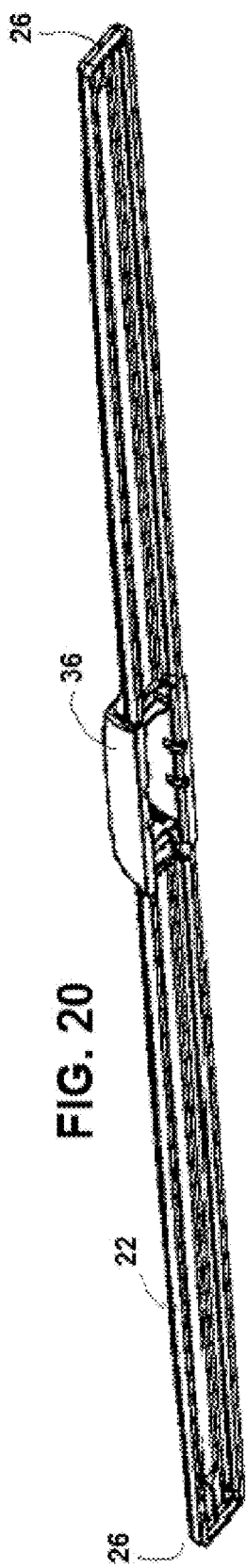
FIG. 20 illustrates a perspective bottom view of a second embodiment of an elongate windshield wiper cover according to one aspect of the present invention.
Figure 21:
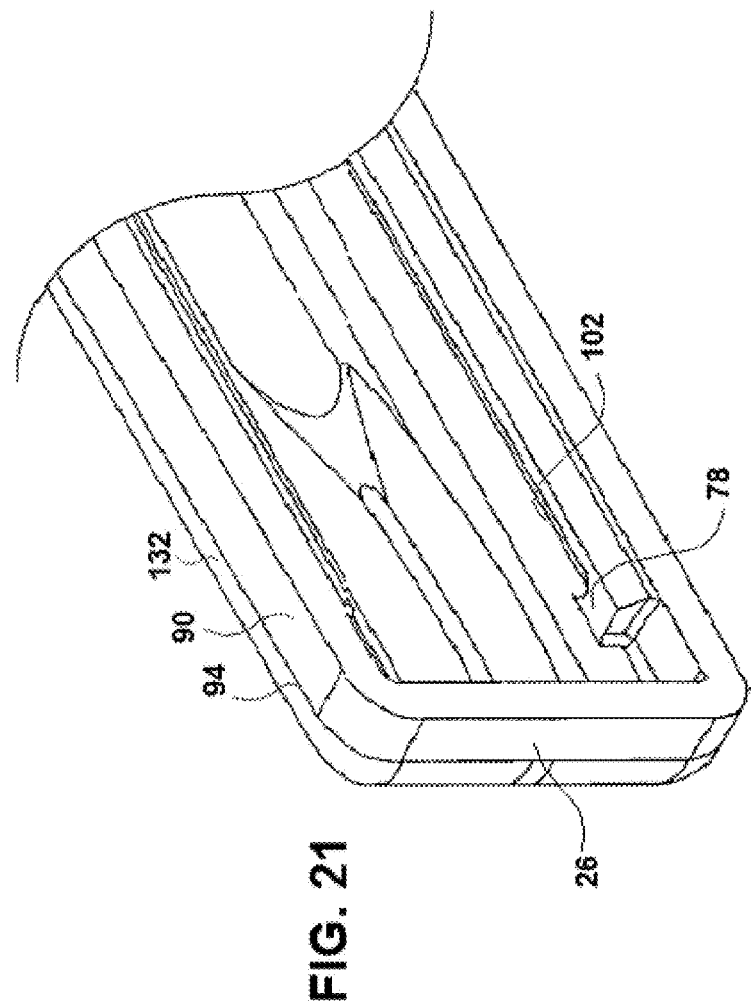
FIG. 21 illustrates a cutaway perspective bottom view of a second embodiment of an elongate windshield wiper cover end according to one aspect of the present invention.

FIGS. 3-5 illustrate collar 36, which is located at an approximate midpoint between ends 26. In general, collar 36 has a rectangular exterior surface with curvilinear contours that limit the formation of wind vortices. Collar 36 forms an interior passageway 42, which receives mounting base or other connection device 14 during assembly of the windshield wiper. In addition, the interior perimeter of collar 36 is provided with a permanent locking cantilevered snap-fit mechanism to partially secure cover 22 to the windshield wiper frame assembly 16. More specifically, as shown in FIG. 5, catches 110 may be designed to engage corresponding slots, recesses, or locators on mounting base or other connection device 14 (FIG. 1). Locators 114 may likewise be provided on the interior perimeter of collar 36 to receive catches from mounting base or other connection device 14, as shown in FIGS. 4 and 16. This snap-fit securing mechanism establishes a close fitting, semi-permanent and durable connection between collar 36 and mounting base or other connection device 14.

Cover 22 may also be attached to wiper frame assembly 16 at cover ends 26 using an end securing mechanism 78. As illustrated in FIG. 6, ends 26 are provided with cantilevered snap fit ends 130 to secure the ends of cover 22 to the wiper frame assembly and limit axial movement of the wiper frame assembly. In addition, cover 22 is stretch-fit and friction fit over the ends of the wiper frame assembly 16. That is, because cover 22 is formed from a polymeric, axially elastomeric material, it can be stretched axially and released over the ends of the wiper frame assembly. Persons of skill in the art will recognize that additional end securing mechanisms, including without limitation dovetails, or extended claws along the entire perimeter of the assembly, or any other suitable method may also be used.

Cover 22 is also attached to wiper frame assembly 16 by longitudinal grooves 102 provided on an interior portion of the wiper cover, as illustrated in FIG. 6. Grooves 102 are formed by parallel rails 104, which are disposed axially along longitudinal axis 52. During assembly, the longitudinal edges of the elongate beam 11 of the wiper frame assembly are mated in a friction fit relationship with longitudinal grooves 102, thus preventing or limiting separation of cover 22 from the wiper frame assembly. The parallel rails 104 may have rail ends 122 which stop before reaching the ends of the cover 26, thereby leaving a gap between the rail ends 122 and the end retainers 78.

Accordingly, as discussed above, cover 22 is secured to the windshield wiper frame assembly 16 at or along three principle sections of the windshield wiper blade to avoid inadvertent detachment of the cover from the wiper frame assembly during use. These attachment sections are between the collar and the mounting base or other connecting device; between the ends of the cover and the ends of the beam or wiper blade frame assembly; and along the axial axis of the cover and the wiper frame assembly.

Figure 13:
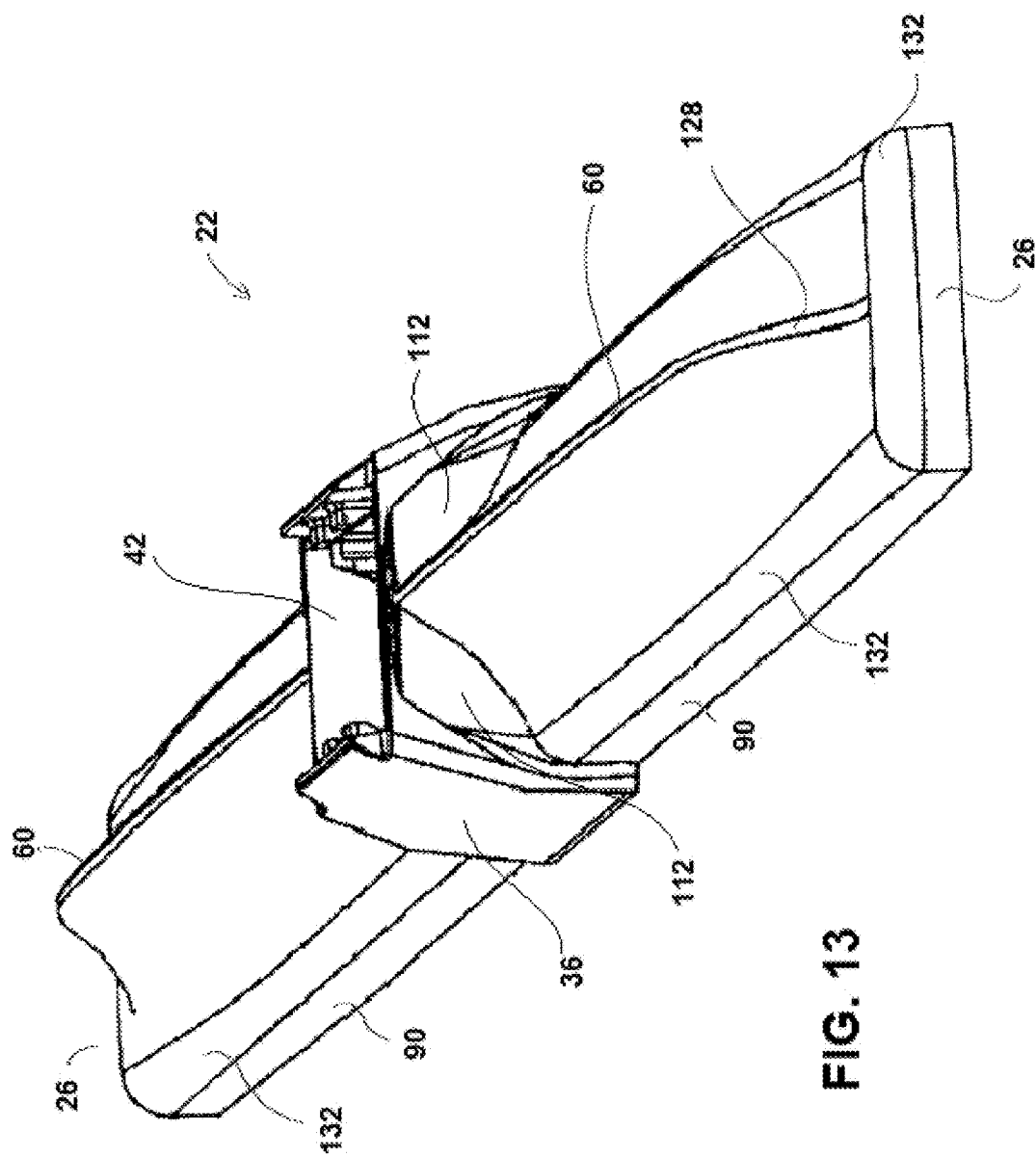
FIG. 13 illustrates a perspective side view of a second embodiment of an elongate windshield wiper cover according to one aspect of the present invention.

FIGS. 13-21 illustrate a second embodiment of a wiper blade having a wiper cover 22 with a central collar 36 and a wind deflector 60. A steep upward slope 112 joins collar 36 to wind deflector 60. Slope 112 reduces the formation of noisy wind vortices during operation. Wind deflector 60 is disposed along a central portion of the longitudinal axis of cover 22. In addition, wind deflector 60 includes a sloped region 128 is provided to reduce the size of wind deflector 60 at approximately end 26. As illustrated in FIG. 16, wind deflector 60 forms substantially similar sides 128. As best shown in FIG. 13, sides 128 are provided with chamfers 132 that are joined at seams 94 to a skirt 90. The securing mechanism of cover 22 is substantially identical to that of the embodiment described in detail above.

Figure 22:
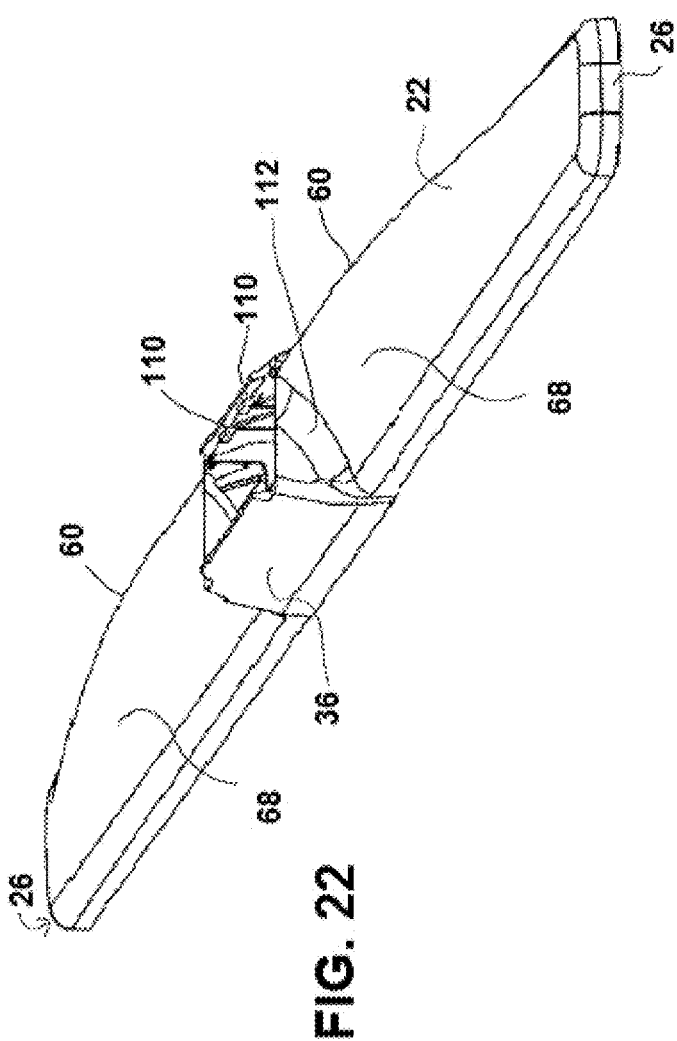
FIG. 22 illustrates a perspective front view of a third embodiment of an elongate windshield wiper cover according to one aspect of the present invention.
Figure 23:
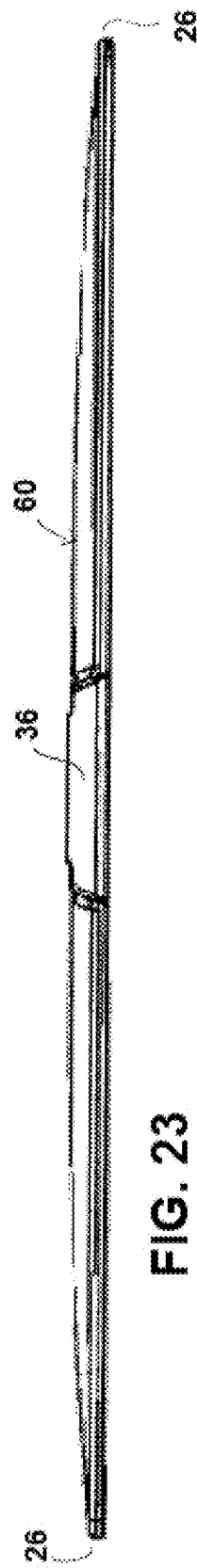
FIG. 23 illustrates a side view of a third embodiment of an elongate windshield wiper cover according to one aspect of the present invention.
Figure 30:
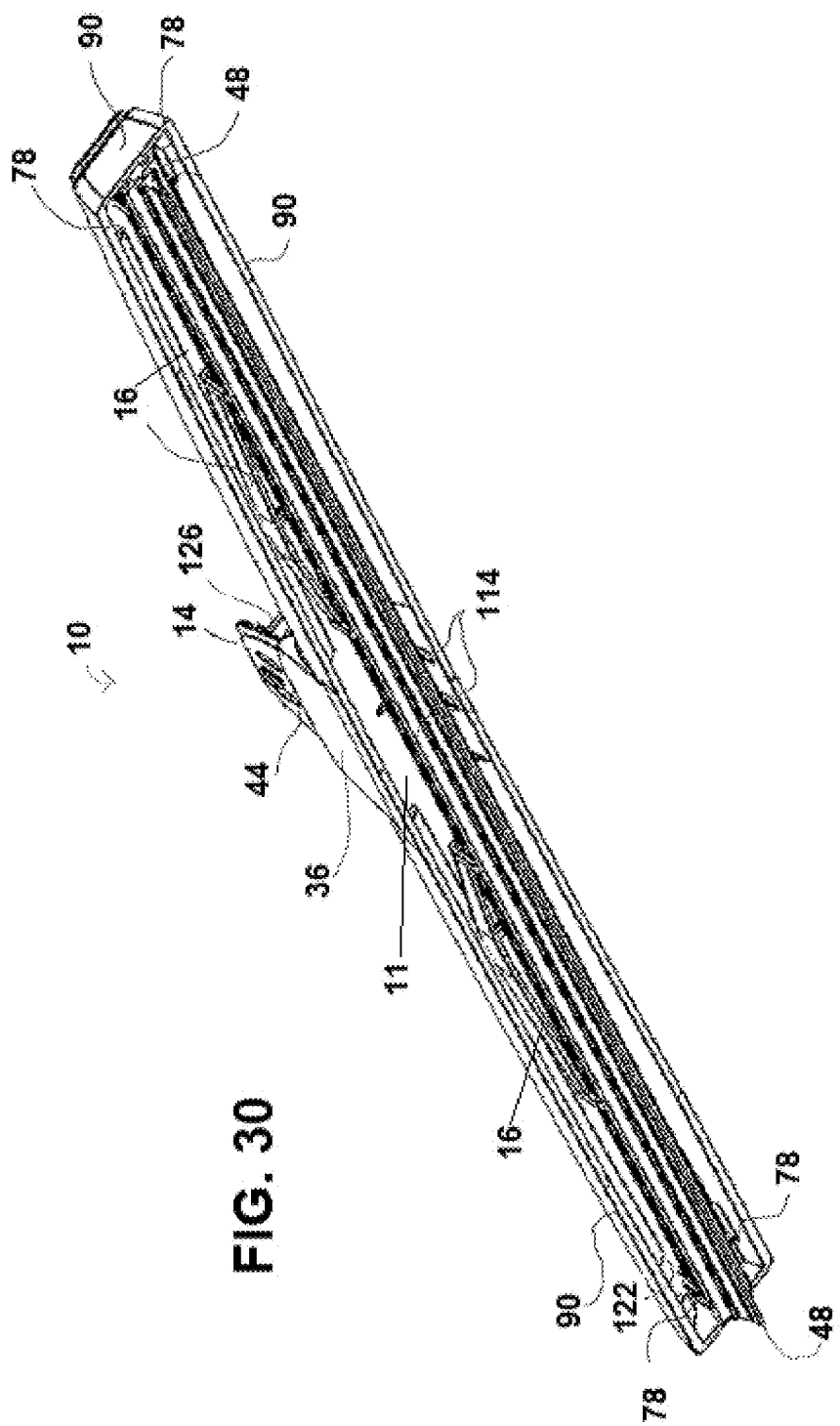
FIG. 30 illustrates a perspective bottom view of a fourth embodiment of an elongate windshield wiper according to one aspect of the present invention.
Figure 31:
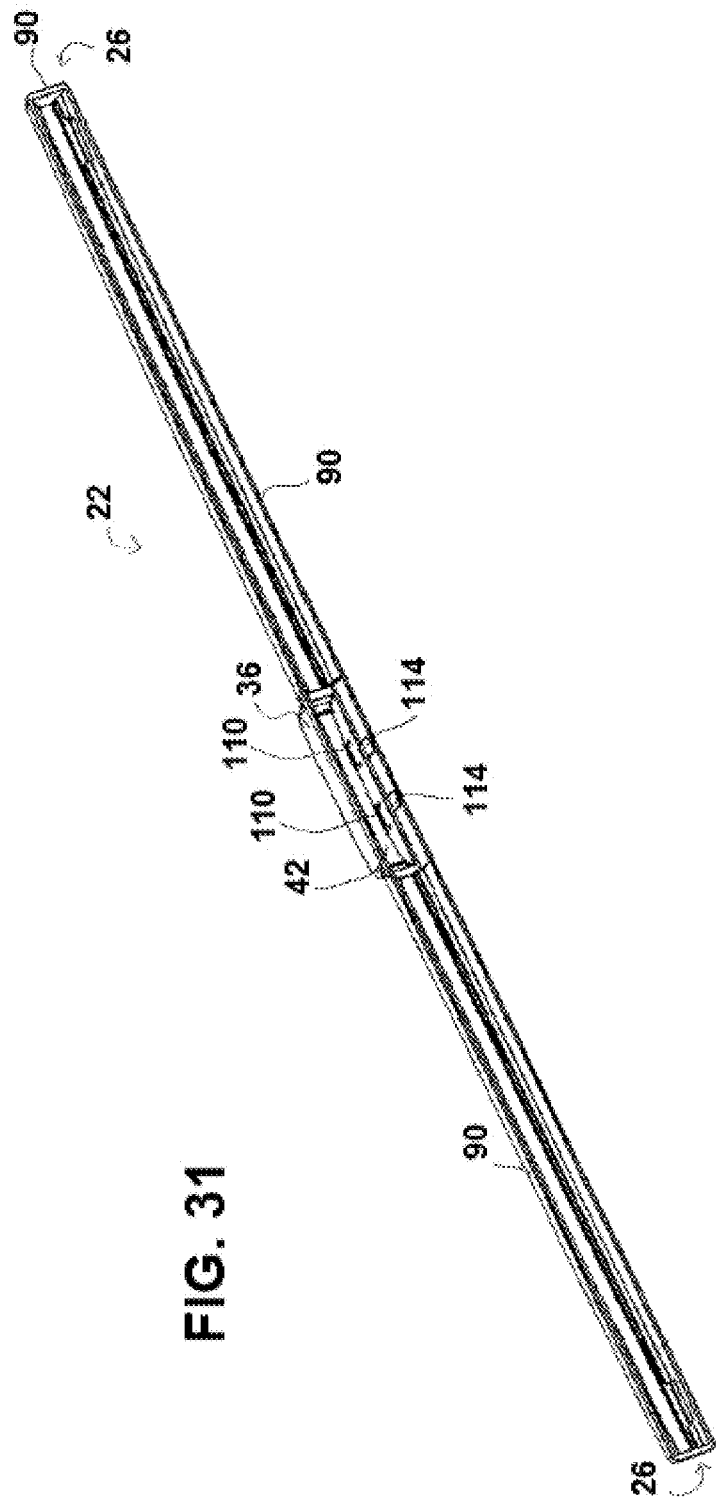
FIG. 31 illustrates a perspective bottom view of a fourth embodiment of an elongate windshield wiper cover according to one aspect of the present invention.
Figure 32:
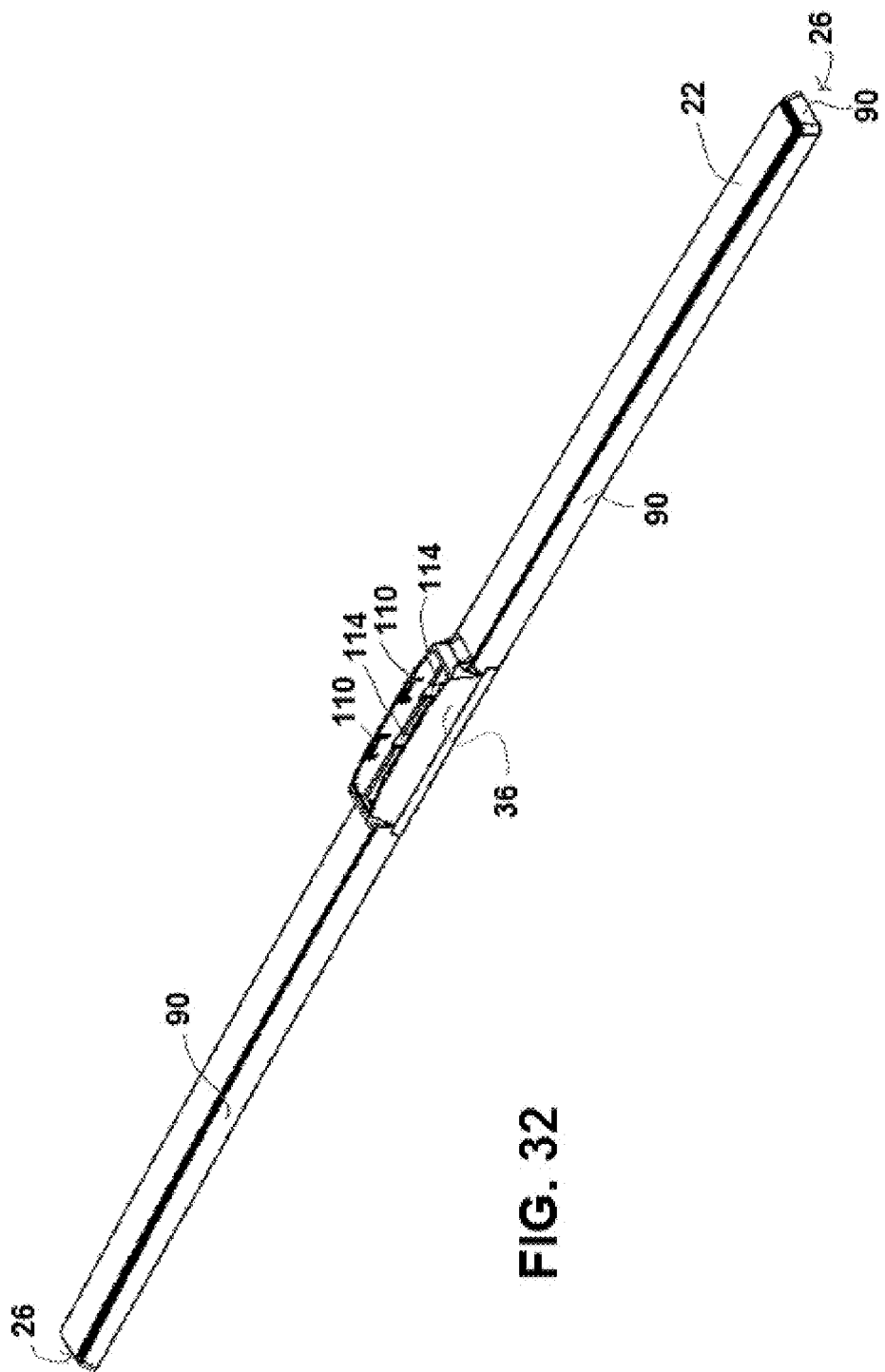
FIG. 32 illustrates a perspective side view of a fourth embodiment of an elongate windshield wiper cover according to one aspect of the present invention.
Figure 33:
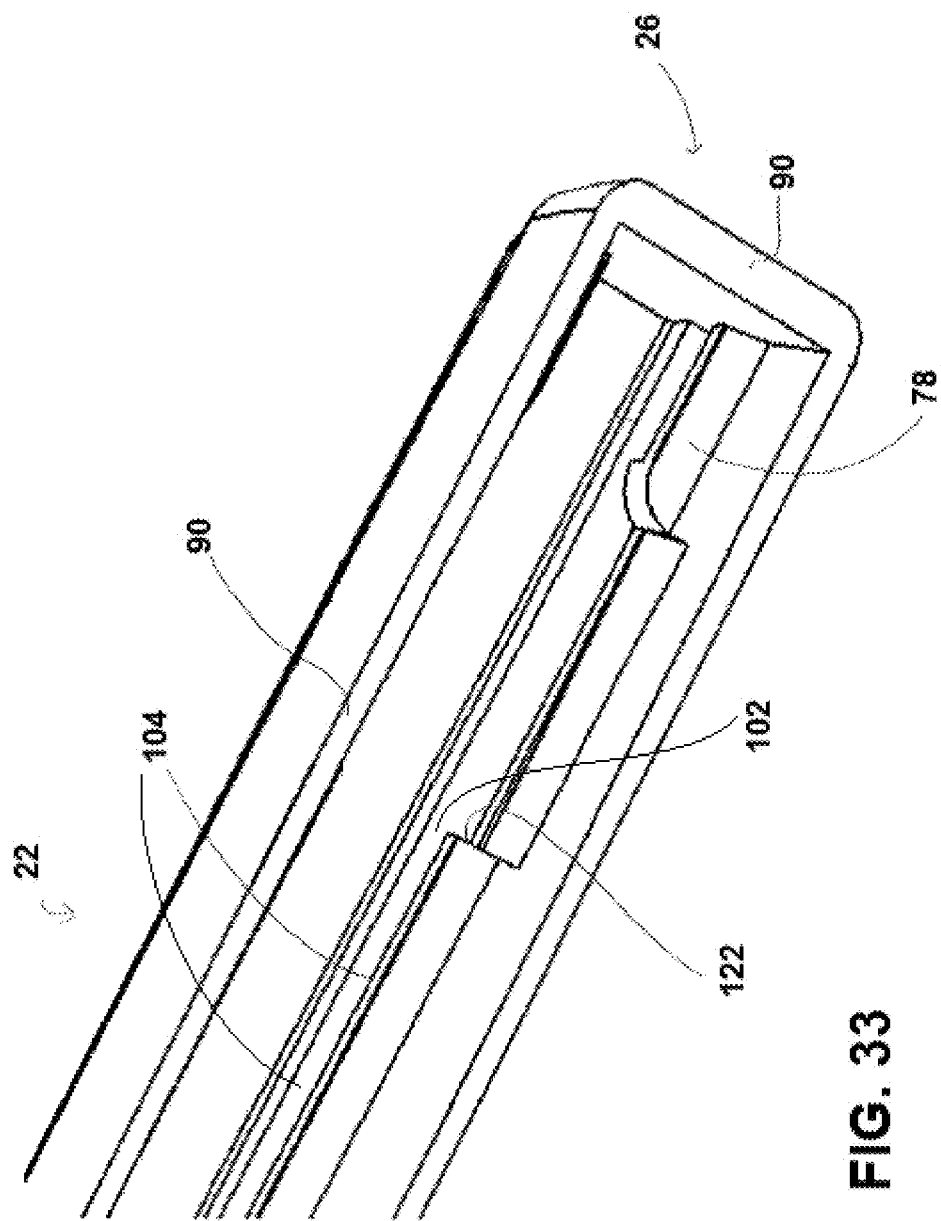
FIG. 33 illustrates a cutaway perspective bottom view of a fourth embodiment of an elongate windshield wiper cover end according to one aspect of the present invention.
Figure 34:
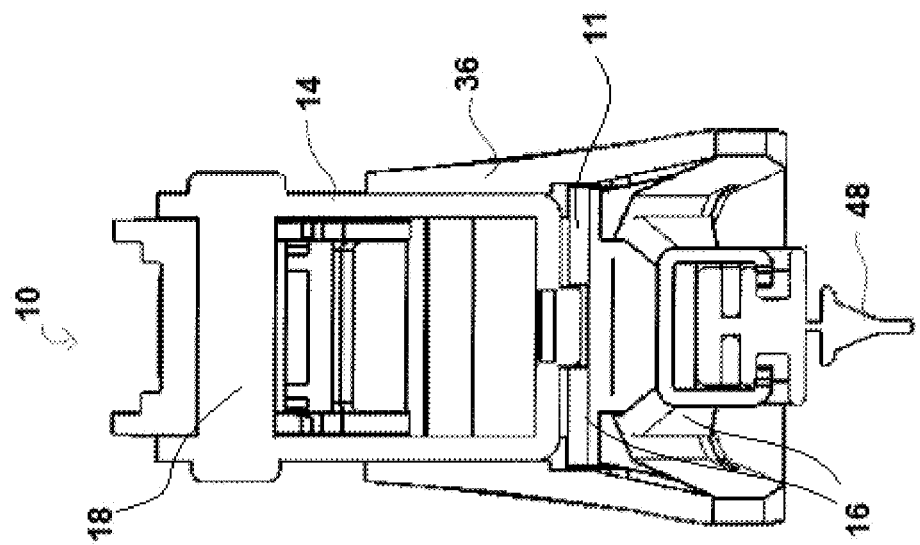
FIG. 34 illustrates a side view of a fourth embodiment of a windshield wiper having an elongate windshield wiper cover according to one aspect of the present invention.
Figure 35:
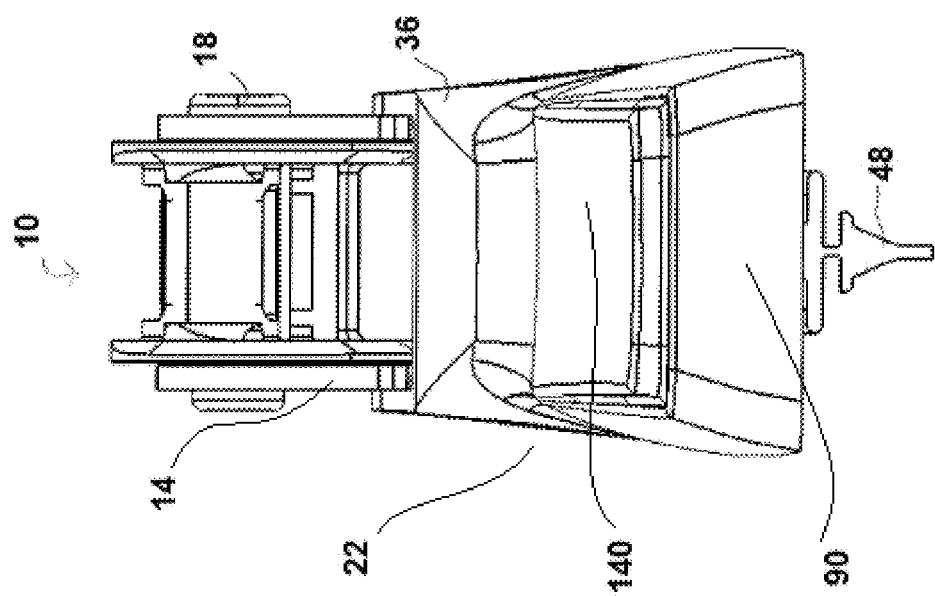
FIG. 35 illustrates a cross-section side view of a fourth embodiment of a windshield wiper according to one aspect of the present invention.

FIGS. 22-28 illustrate a third embodiment of a wiper blade having a wiper cover with a central collar. As best illustrated in FIG. 22, the wind deflector 60 is offset from a central, longitudinal axis of cover 22. The offset wind deflector defines a windward surface 68 that provides a downward force on the wiper blade when in use. The downward force limits separation of the wiper strip from the window during operation. As in previously discussed embodiments, a steep upward slope 112 in collar 36 limits the formation of noisy wind vortices. The securing mechanism of cover 22 is substantially identical to that of the embodiment described in detail above, though again other securing mechanism known in the art may also be used.

FIGS. 29-41 illustrate a fourth embodiment of a wiper blade having a wiper cover 22 with a central collar 36. Wiper cover 22 has a substantially planar skirt 90 that is joined to a planar upper surface 140. Skirt 90 forms the exterior perimeter of cover 22. In addition, chamfers 132 are provided to reduce or limit the formation of noisy air vortices. Steep upward slope 112 is also provided to reduce or limit the formation of noisy air vortices. The securing mechanism of cover 22 is substantially identical to that of the embodiment described in detail above.

It is intended that the foregoing detailed description be regarded as illustrative rather than limiting, and that it be understood that it is the following claims, including all equivalents, that are intended to define the spirit and scope of this invention.

The invention claimed is:

1. A wiper blade, comprising:
   a frame with outer ends;
   a connection device, and a wiper strip connected to the frame; and
   a monolithic cover comprising a elongate body having lateral sides and an integrated central collar, first and second elongate portions extending from the central collar, the first and second elongate portions having outer ends;

an end retainer defined at the outer ends including a protrusion beginning at a first distance near, but longitudinally separated from the outer end, extending inwardly and longitudinally, and ending at a second distance near, but longitudinally separated from the outer end, as well as beginning at one side of the body, extending inwardly and laterally, and ending at a distance from the one side of the body; and a frame securing mechanism;

wherein the end retainers cover the outer ends of the frame.

2. The wiper blade of claim 1 wherein the unitary elongate cover further comprises a wind deflector.

3. The wiper blade of claim 1, further comprising a first slope connecting the integrated central collar to the first elongate portion and a second slope connecting the central collar to the second elongate portion.

4. The wiper blade of claim 3, wherein the the integrated central collar comprises a tongue configured to snap-fit into a recess defined by the connection device.

5. The wiper blade of claim 3, wherein the first and second elongate portions comprise an elastomeric region.

6. The wiper blade of claim 1, wherein the integrated central collar defines an interior passageway, the interior passageway having a snap-fit tongue.

7. The wiper blade of claim 1, further comprising a pair of substantially parallel longitudinal rails disposed along an inner surface of each of the first and second elongate portion, each of the rails extending from the integrated collar to the outer ends, the pair of rails defining a channel therebetween, the channel dimensioned to receive the frame and secure the first and second elongate portions to the frame, the outer ends enclosing the respective ends of the channel.

8. A monolithic windshield wiper cover comprising:
a elongate body having
lateral sides and an integrated central collar,
first and second elongate portions extending from the integrated central collar, the first and second elongate portions having outer ends;
an end retainer defined at the outer ends including a protrusion beginning at a first distance near, but longitudinally separated from the outer end, extending inwardly and longitudinally, and ending at a second distance near, but longitudinally separated from the outer end, as well as beginning at one side of the body, extending inwardly and laterally, and ending at a distance from the one side of the body; and
a frame securing mechanism.

9. The windshield wiper cover of claim 8, wherein the integrated central collar defines an interior passageway, the interior passageway having a snap-fit tongue.

10. The windshield wiper cover of claim 8, wherein the frame securing mechanism comprises a pair of substantially parallel longitudinal rails disposed along an inner surface of the sides of each of the first and second elongate portions, each of the rails extending from the integrated central collar to the outer ends, a channel defined between the pair of rails, the channel dimensioned to receive a wiper frame assembly, the outer ends enclosing respective ends of the channel.

11. The windshield wiper of claim 10, wherein one of the longitudinal rails projects longitudinally from the protrusion and the channel terminates at the protrusion.

12. The windshield wiper cover of claim 8, further comprising a wind deflector disposed along the first and second elongate portions.

13. The windshield wiper cover of claim 12, wherein the wind deflector defines a windward side having a first surface area and a leeward side having a second surface area, and wherein the first surface area is greater than the second surface area.

14. The windshield wiper cover of claim 12, wherein the wind deflector defines a perimeter, the perimeter having a chamfered surface.

15. The windshield wiper cover of claim 12, wherein the wind deflector defines a windward side having a first surface area and a leeward side having a second surface area, and wherein the size of the first surface area is substantially the same as the size of the second surface area.

16. The windshield wiper cover of claim 8, wherein the unitary elongate body has at least one elastomeric region.

17. The windshield wiper cover of claim 8, further comprising a chamfer on the first and second elongate portions.

18. A monolithic windshield wiper cover comprising:
a elongate body having
lateral sides, an integrated central collar, first and second elongate portions extending from the integrated central collar, the first and second elongate portions having outer ends;
the integrated central collar defining an interior passageway, the interior passageway having a snap-fit tongue;
an end retainer defined at the outer ends including a protrusion beginning at a first distance near, but longitudinally separated from the outer end, extending inwardly and longitudinally, and ending at a second distance near, but longitudinally separated from the outer end, as well as beginning from one side of the body, extending inwardly and laterally, and ending at a distance from the one side of the body;
a frame securing mechanism; and
a substantially planar skirt positioned on a perimeter of the first and second elongate portions of the elongate body.

19. The windshield wiper cover of claim 18, wherein the frame securing mechanism comprises a pair of substantially parallel longitudinal rails disposed along an inner surface of the sides of each of the first and second elongate portions, each of the rails extending from the integrated central collar to the outer ends, the pair of rails defining a channel therebetween, the channel dimensioned to receive a wiper frame assembly, the outer ends enclosing respective ends of the channel.

20. The windshield wiper of claim 19, wherein one of the longitudinal rails projects longitudinally from the protrusion and the channel terminates at the protrusion.

21. The windshield wiper cover of claim 18, further comprising a sloped region between the integrated central collar and the first and second elongate portions.

22. The windshield wiper cover of claim 21, further comprising a substantially planar upper portion connected to the skirt.

* * * * *